US006988273B2

(12) United States Patent
Matula et al.

(10) Patent No.: US 6,988,273 B2
(45) Date of Patent: *Jan. 17, 2006

(54) METHOD FOR DYNAMIC IMPLEMENTATION OF JAVA™ METADATA INTERFACES

(75) Inventors: Martin Matula, Prague (CZ); Petr Hrebejk, Usti nad Labem (CZ)

(73) Assignee: Sun Microsystems, Inc., Santa Clara, CA (US)

( * ) Notice: Subject to any disclaimer, the term of this patent is extended or adjusted under 35 U.S.C. 154(b) by 535 days.

This patent is subject to a terminal disclaimer.

(21) Appl. No.: 09/847,781

(22) Filed: May 1, 2001

(65) Prior Publication Data

US 2002/0165786 A1   Nov. 7, 2002

(51) Int. Cl.
G06F 3/00 (2006.01)
G06F 9/44 (2006.01)
G06F 9/46 (2006.01)
G06F 13/00 (2006.01)

(52) U.S. Cl. ...................... 719/316; 719/320
(58) Field of Classification Search ........ 719/313–316, 719/320, 328; 717/106–108, 114, 116–118
See application file for complete search history.

(56) References Cited

U.S. PATENT DOCUMENTS 5,355,472 A    10/1994  Lewis ..................... 395/600
5,848,273 A *  12/1998  Fontana et al. ........... 717/108
6,023,579 A *   2/2000  Hellgren et al. .......... 717/108
6,381,743 B1*   4/2002  Mutschler, III ........... 717/104
6,385,661 B1*   5/2002  Guthrie et al. ........... 719/316

OTHER PUBLICATIONS

Blosser, Explore the Dynamic Proxy API, Java World, Nov. 2000, pp. 1-13.*
Sun Microsystems, Dynamic Proxy Classes, 1999, pp. 1-10.*

* cited by examiner

Primary Examiner—Meng-Al T. An
Assistant Examiner—Diem Cao
(74) Attorney, Agent, or Firm—Gunnison, McKay & Hodgson, L.L.P.

(57) ABSTRACT

A method for dynamic implementation of a Java™ Metadata Interface (JMI) to a metamodel includes receiving a JMI implementation request, implementing a package proxy JMI interface when the request is a package proxy request, implementing a class proxy JMI interface when the request is a class proxy request and implementing a class instance JMI interface when the request is a class instance request. The request is associated with a metamodel that includes at least one package. The at least one package includes at least one class. The at least one class includes at least one attribute reference or operation. An apparatus for dynamic implementation of a Java™ Metadata Interface (JMI) to a metamodel includes a requestor to make a JMI implementation request, a package proxy implementor to implement a package proxy JMI interface when the request is a package proxy request, a class proxy implementor to implement a class proxy JMI interface when the request is a class proxy request and a class instance implementor to implement a class instance JMI interface when the request is a class instance request.

64 Claims, 22 Drawing Sheets

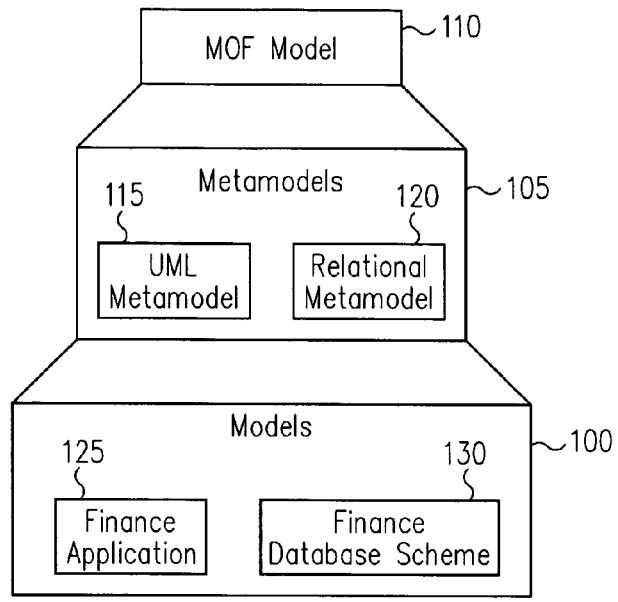

FIG. 1A
(PRIOR ART)

| Level | Description | Example |
|---|---|---|
| M3 meta-metamodel | Defines language for specifications of metamodels | MetaClass, MetaAttribute, MetaOperation |
| M2 metamodel | Instance of meta-metamodel Defines language for describing specifications of models | Class, Attribute, Operation, Component |
| M1 model | Instance of meta-metamodel Defines language for describing information domains | Point, xCoordinate, yCoordinate, move (int dx, int, dy) |
| M0 user objects | Instance of model | Point [x=100; y=20] |

FIG. 1B
(PRIOR ART)

METHOD FOR DYNAMIC IMPLEMENTATION OF JAVA™ METADATA INTERFACES

CROSS REFERENCE TO RELATED APPLICATIONS

This application is related to the following:

U.S. patent application Ser. No. 08/847,770, filed May 1, 2001 in the name of inventors Petr Hrebejk, Martin Matula, and Pavel Buzek, entitled "Method for Meta Object Facility Repository Bootstrap", commonly assigned herewith; and U.S. patent application Ser. No. 09/848,392, entitled "Apparatus for Dynamic Implementation of Java™ Metadata Interfaces, " of Martin Matula and Petr Hrebejk filed on May 2, 2001, which is commonly assigned herewith and is a continuation of the instant application.

FIELD OF THE INVENTION

The present invention relates to the field of computer science. More particularly, the present invention relates to a method for dynamic implementation of Java™ metadata interfaces.

BACKGROUND OF THE INVENTION

Today's Internet-driven economy has accelerated users' expectations for unfettered access to information resources and transparent data exchange among applications. One of the key issues limiting data interoperability today is that of incompatible metadata. Metadata is information about other data, or simply data about data. Metadata is typically used by tools, databases, applications and other information processes to define the structure and meaning of data objects.

Unfortunately, most applications are designed with proprietary schemes for modeling metadata. Applications that define data using different semantics, structures and syntax are difficult to integrate, impeding the free flow of information access across application boundaries. This lack of metadata interoperability hampers the development and efficient deployment of numerous business solutions. These solutions include data warehousing, business intelligence, business-to-business exchanges, enterprise information portals and software development.

An improvement is made possible by establishing standards based upon XML Document Type Definitions (DTDs). However, DTDs lack the capability to represent complex, semantically rich, hierarchical metadata.

A further improvement is made possible by the Meta Object Facility (MOF) specification. MOF is described in a text entitled "Meta Object Facility (MOF) Specification", Object Management Group, Inc., version 1.3, March 2000. The MOF specification defines a standard for metadata management. The goal of MOF is to provide a framework and services to enable model and metadata driven systems. The MOF is a layered metadata architecture consisting of a single meta-metamodel (M3), metamodels (M2) and models (M1) of information. Each meta level is an abstraction of the meta level below it. These levels of abstraction are relative, and provide a visual reference of MOF based frameworks. Metamodeling is typically described using a four-layer architecture. These layers represent different levels of data and metadata. Layers M1, M2 and M3 are depicted in FIG. 1A. FIG. 1B includes a summary and example of each layer.

The information layer (also known as the M0 or data layer) refers to actual instances of information. These are not shown in FIG. 1A, but examples of this layer include instances of a particular database, application data objects, etc.

The model layer 100 (also known as the M1 or metadata layer) defines the information layer. The model layer 100 describes the format and semantics of the data. The metadata specifies, for example, a table definition in a database schema that describes the format of the M0 level instances. A complete database schema combines many metadata definitions to construct a database model. The M1 layer 100 represents instances (or realizations) of one or more metamodels.

The metamodel layer 105 (also known as the M2 or meta-metadata layer) defines the model layer. The metamodel layer 105 describes the structure and semantics of the metadata. The metamodel specifies, for example, a database system table that describes the format of a table definition. A metamodel can also be thought of as a modeling language for describing different kinds of data. The M2 layer represents abstractions of software systems modeled using the MOF Model. Typically, metamodels describe technologies such as relational databases, vertical domains, etc.

The meta-metamodel (M3) layer 110 defines the metamodel layer. The meta-metamodel layer 110 describes the structure and semantics of the meta-metadata. It is the common "language" that describes all other models of information. Typically, the meta-metamodel is defined by the system that supports the metamodeling environment. In the case of relational databases, the meta-metamodel is hard-wired by the SQL standard.

In addition to the information-modeling infrastructure, the MOF specification defines an Interface Definition Language (IDL) mapping for manipulating metadata. More specifically, for any given MOF compliant metamodel, the IDL mapping generates a set of Application Program Interfaces (APIs) that provide a common IDL programming model for manipulating the information contained in any instance of that metamodel. The MOF model itself is a MOF compliant model. Therefore, the MOF model can be described using the MOF. Consequently, APIs used to manipulate instances of the MOF Model (i.e., metamodels) conform to the MOF to IDL mapping.

Other mappings may be used to manipulate metadata. The mappings define how to generate a set of APIs that provide a common programming model for manipulating metadata of any MOF compliant model. Using the mappings, applications and tools that specify their interfaces to the models using MOF-compliant Unified Modeling Language (UML) can have the interfaces to the models automatically generated. Using this generated set of APIs, applications can access (create, delete, update and retrieve) information contained in a MOF compliant model. This is illustrated below with reference to FIG. 2.

A sample mapping for the Java™ language is as follows: A class proxy interface name <ClassName>Class and an instance interface named <ClassName> are generated for each class. For example, a class named "abc" has a class proxy interface named "abcClass" and an instance interface named "abc". Two methods are generated for each attribute/reference pair in the corresponding instance interface. The first method sets the value of an attribute or reference and is named set<Attribute/ReferenceName>. The second method gets the value of an attribute or reference and is named get<Attribute/ReferenceName>. An operation method is also generated for each operation in the corresponding instance interface. The operation method name is the same as the operation name. Each class proxy interface includes a method named create<ClassName> to create a class instance. A package proxy interface named <PackageName>Package is also generated for each package. Each package proxy interface includes accessor methods named get<ClassName>Class for each class contained by the package. These methods are used to return the class proxy for the corresponding class. The above mapping is referred to herein as a Java™ Metadata Interface (JMI).

Turning now to FIG. 2, a flow diagram that illustrates using manually coded Java™ Metadata Interface (JMI) interfaces to access a metamodel is presented. At 200, a repository receives a metamodel. At 205, the repository automatically generates JMI interfaces for the metamodel. At 210, a repository user manually develops the software implementation for the JMI interfaces generated at reference numeral 205. At 215, the repository user compiles the coded JMI interface implementations. At 220, the repository user uses the compiled JMI interface implementations to access the metamodel.

Turning now to FIG. 3, a flow diagram that illustrates a method for automatically generating Java™ metadata interfaces is presented. FIG. 3 provides more detail for reference numeral 205 of FIG. 2. At 300, a package proxy interface is generated for each object of type "Package". Sample package proxy interface 305 includes accessor methods 310, 315 for each class proxy in the package. Each accessor method name has a "get" prefix and a "Class" suffix. The package proxy interface name includes the package name followed by "Package". At 320, a class proxy interface is generated for each object of type "Class". Sample class proxy interface 325 includes factory methods 330, 335 for a class. Each factory method name has a "create" prefix. The class proxy interface name includes the class name followed by "Class". At 340, an instance interface is generated for each object of type "Class". Sample instance interface 345 includes "get" and "set" methods for each attribute and reference. Sample instance interface 345 also includes operation methods for each operation. The instance interface name is the same as the class name.

Hard-coding JMI interface implementations requires significant coding efforts, both initially and subsequently due to JMI Specification changes. What is needed is a solution that decreases the amount of hard-coding required to implement a JMI interface.

BRIEF DESCRIPTION OF THE INVENTION

A method for dynamic implementation of a Java™ Metadata Interface (JMI) to a metamodel includes receiving a JMI implementation request, implementing a package proxy JMI interface when the request is a package proxy request, implementing a class proxy JMI interface when the request is a class proxy request and implementing a class instance JMI interface when the request is a class instance request. The request is associated with a metamodel that includes at least one package. The at least one package includes at least one class. The at least one class includes at least one attribute reference or operation. An apparatus for dynamic implementation of a Java™ Metadata Interface (JMI) to a metamodel includes a requestor to make a JMI implementation request, a package proxy implementor to implement a package proxy JMI interface when the request is a package proxy request, a class proxy implementor to implement a class proxy JMI interface when the request is a class proxy request and a class instance implementor to implement a class instance JMI interface when the request is a class instance request.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 1 is a block diagram that illustrates a four-layer architecture used to describe metamodeling.

DETAILED DESCRIPTION OF A PREFERRED EMBODIMENT

Embodiments of the present invention are described herein in the context of a method for dynamic implementation of JMI interfaces. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In accordance with one embodiment of the present invention, the components, processes and/or data structures may be implemented using Java™ programs running on high performance computers (such as an Enterprise 2000™ server running Sun Solaris™ as its operating system. The Enterprise 2000™ server and Sun Solaris™ operating system are products available from Sun Microsystems, Inc. of Mountain View, Calif.). Different implementations may be used and may include other types of operating systems, computing platforms, computer programs, firmware, computer languages and/or general-purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

Figure 2:
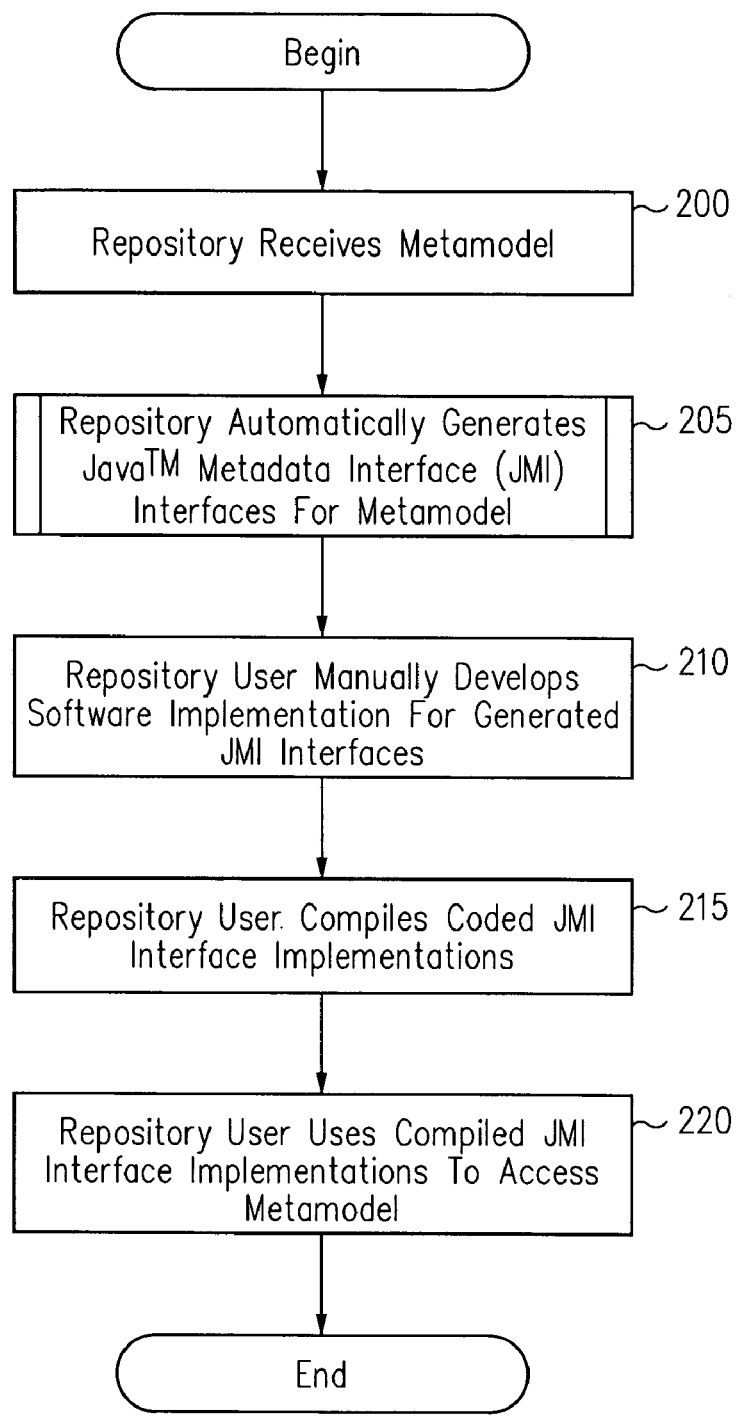
FIG. 2 is a flow diagram that illustrates using manually coded Java™ Metadata Interface (JMI) interfaces to access a metamodel.
Figure 3:
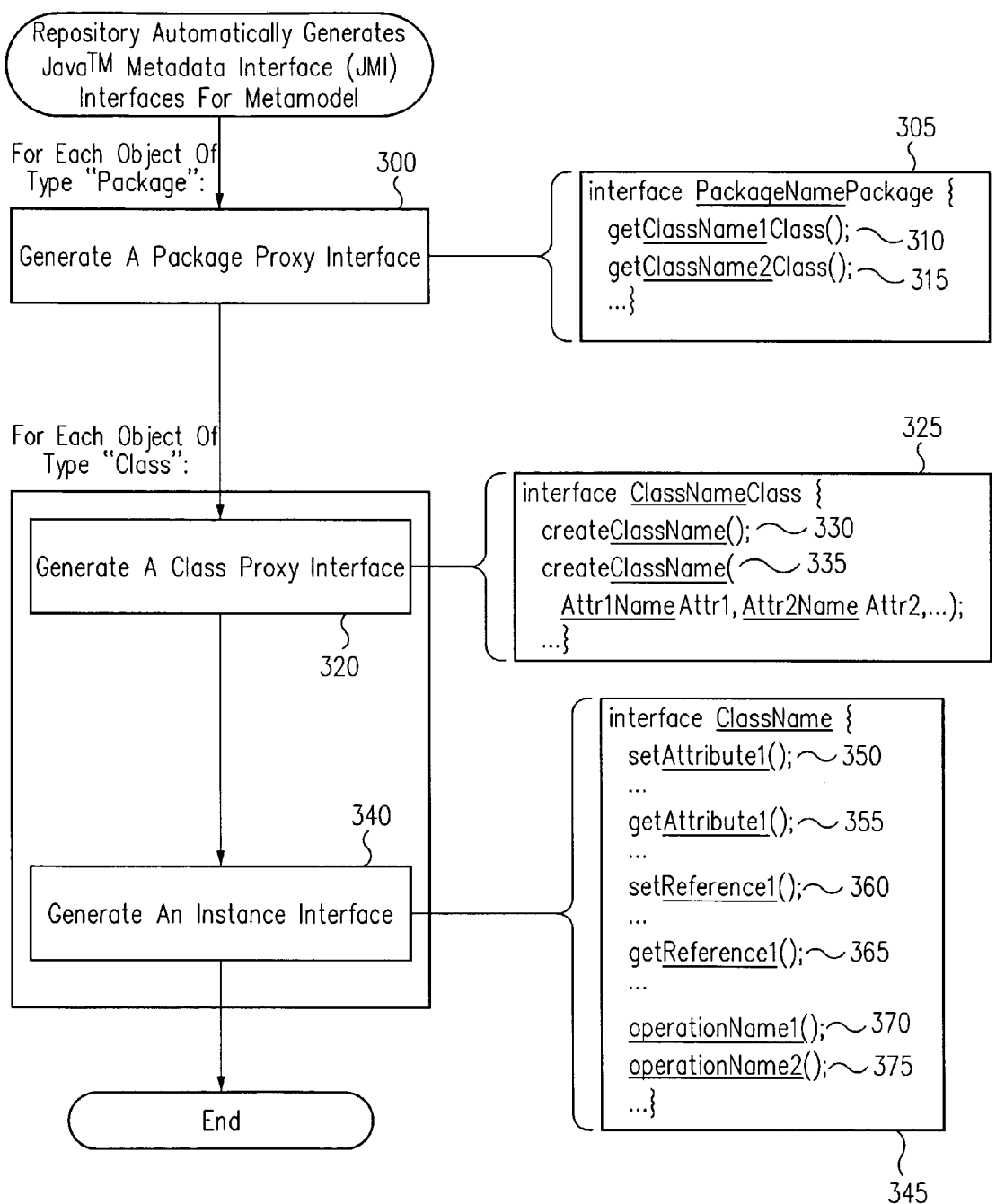
FIG. 3 is a flow diagram that illustrates generating JMI interfaces for a metamodel.
Figure 4:
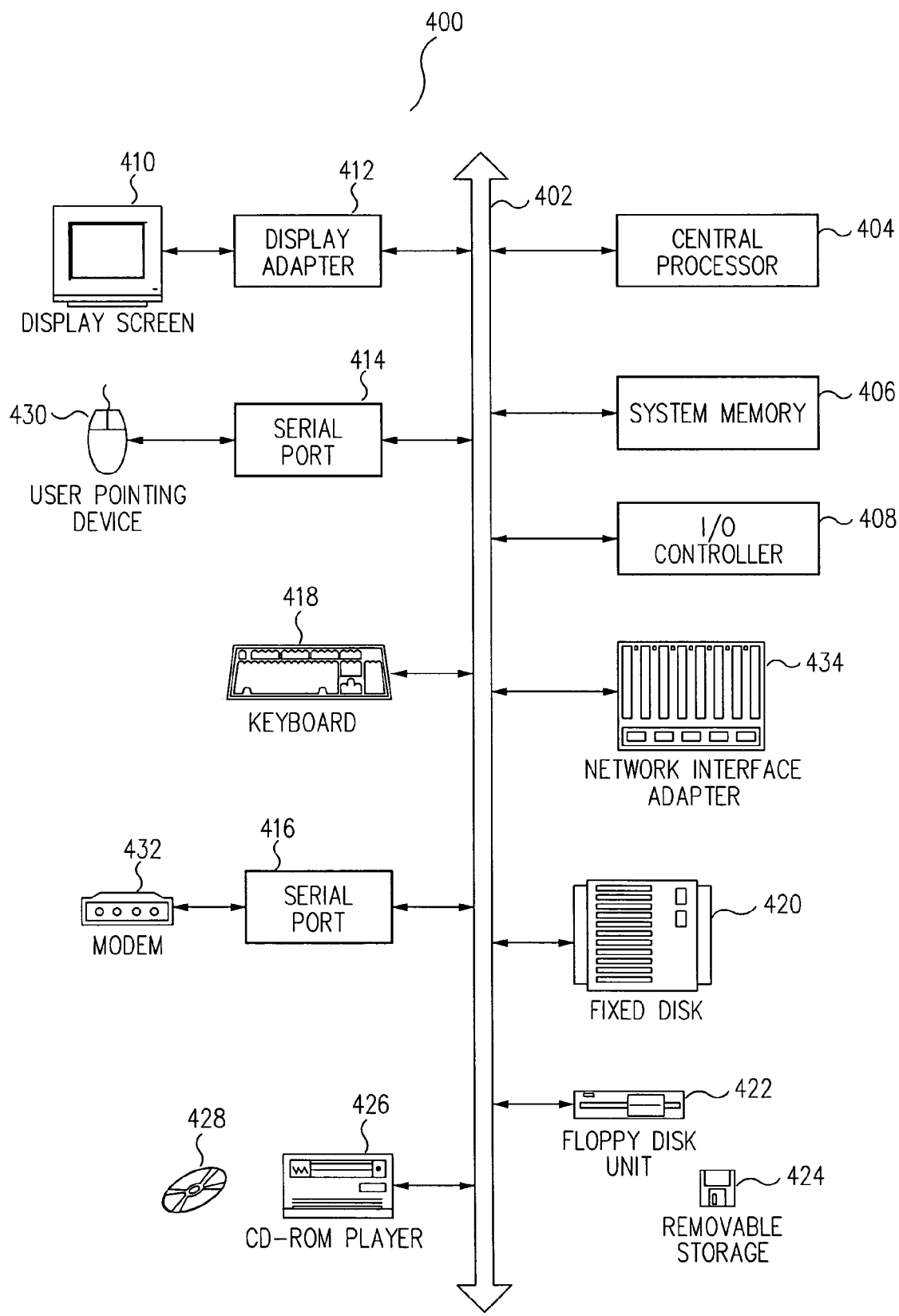
FIG. 4 is a block diagram of a client computer system suitable for implementing aspects of the present invention.

FIG. 4 depicts a block diagram of a computer system 400 suitable for implementing aspects of the present invention. As shown in FIG. 4, computer system 400 includes a bus 402 which interconnects major subsystems such as a central processor 404, a system memory 406 (typically RAM), an input/output (I/O) controller 408, an external device such as a display screen 410 via display adapter 412, serial ports 414 and 416, a keyboard 418, a fixed disk drive 420, a floppy disk drive 422 operative to receive a floppy disk 424, and a CD-ROM player 426 operative to receive a CD-ROM 428. Many other devices can be connected, such as a pointing device 430 (e.g., a mouse) connected via serial port 414 and a modem 432 connected via serial port 416. Modem 432 may provide a direct connection to a remote server via a telephone link or to the Internet via a POP (point of presence). Alternatively, a network interface adapter 434 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 4 to be present to practice the present invention, as discussed below. Furthermore, the devices and subsystems may be interconnected in different ways from that shown in FIG. 4. The operation of a computer system such as that shown in FIG. 4 is readily known in the art and is not discussed in detail in this application, so as not to overcomplicate the present discussion. Code to implement the present invention may be operably disposed in system memory 406 or stored on storage media such as fixed disk 420, floppy disk 424 or CD-ROM 426.

According to embodiments of the present invention, JMI interfaces are dynamically implemented at run-time. The interfaces are implemented automatically as needed.

Figure 5:
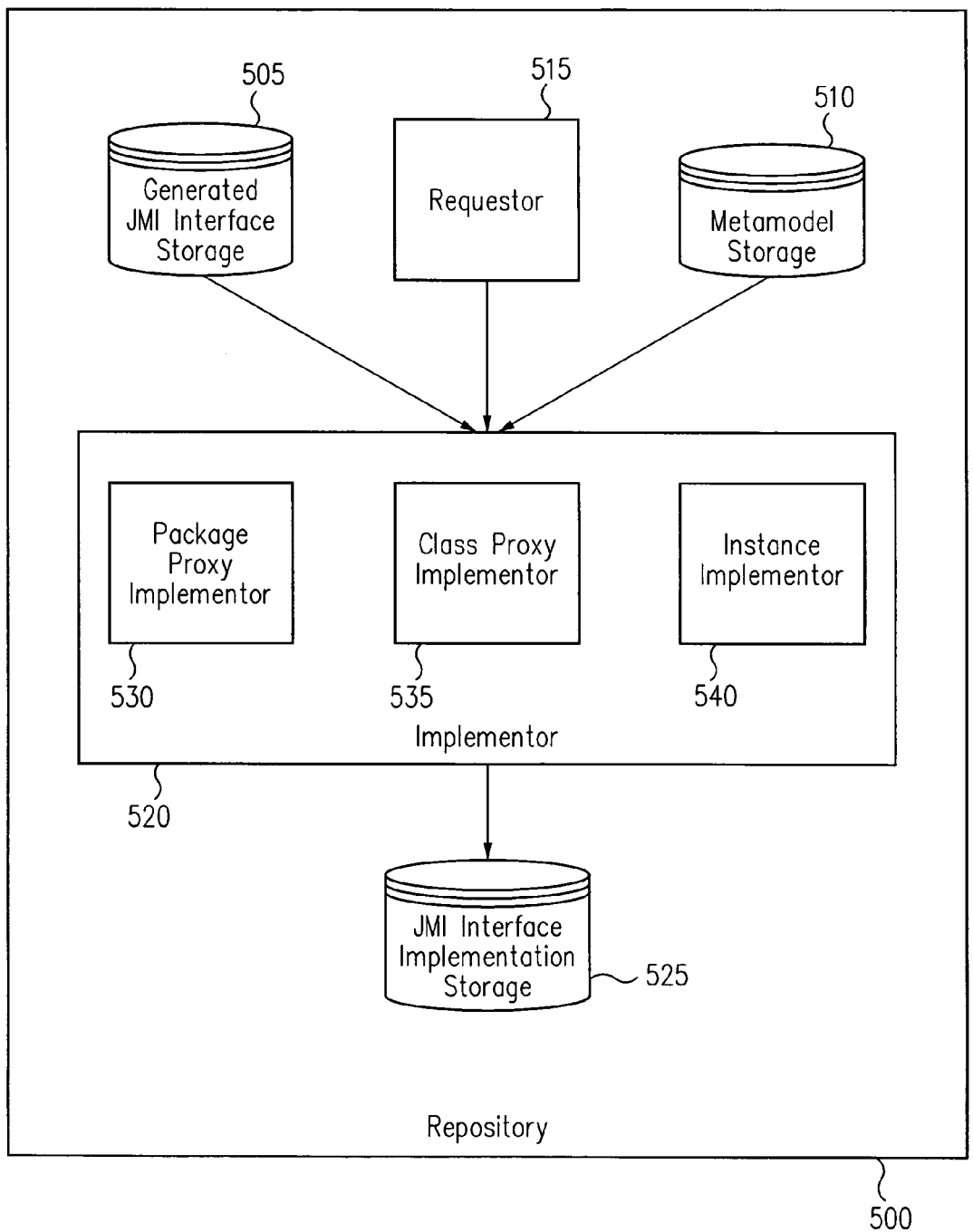
FIG. 5 is a block diagram that illustrates an apparatus for dynamic implementation of JMI interfaces in accordance with one embodiment of the present invention.

Turning now to FIG. 5, a block diagram that illustrates an apparatus for dynamically implementing JMI interfaces in accordance with one embodiment of the present invention is presented. Repository 500 includes generated JMI interface storage 505, metamodel storage 510, requestor 515, implementor 520 and JMI interface implementation storage 525. Implementor 520 includes a package proxy implementor 530, a class proxy implementor 535 and an instance implementor 540. In operation, requestor 515 makes a request that requires an implementation of a package proxy, class proxy or instance. Implementor 520 receives the request from the requestor 515 and forwards it to the package proxy implementor 530, class proxy implementor 535 or instance implementor 540, depending upon the type of request. Implementor 520 receives from generated JMI interface storage 505 the JMI interface associated with the request. Implementor 520 also receives from metamodel storage 510 the metamodel associated with the request. Implementor 520 dynamically creates an implementation of the JMI interface based upon the metamodel. Each implementation is implemented as a subclass of a handler class. Handler classes are explained in more detail below with reference to FIG. 6. Upon implementing a JMI interface, implementor 520 stores the implementation in JMI interface implementation storage 525. According to one embodiment of the present invention, implementor 520 determines whether a requested implementation has been implemented. If the requested implementation has been implemented, a stored implementation is used. Otherwise, implementor 520 dynamically creates the implementation.

Figure 6:
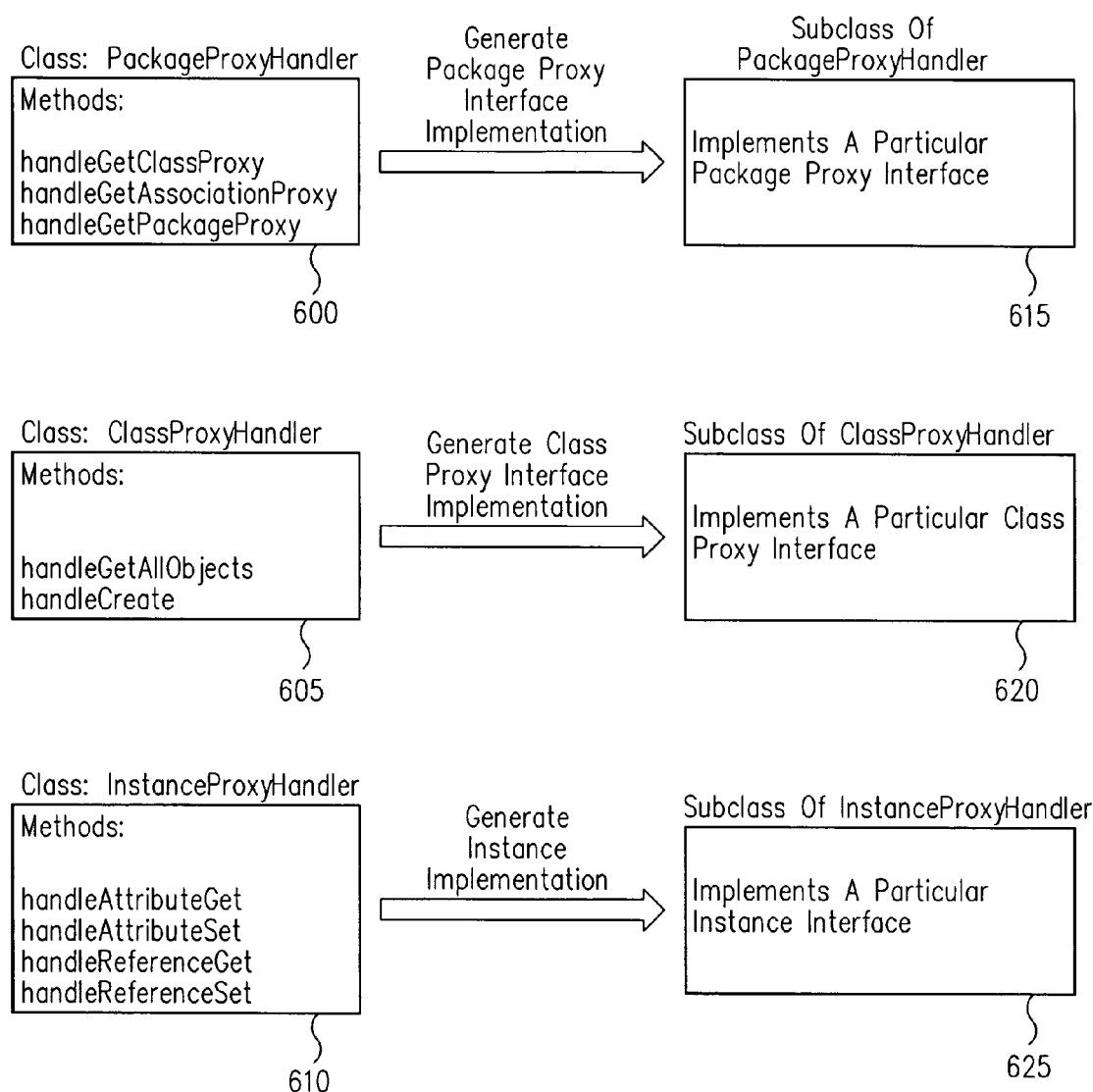
FIG. 6 is a block diagram that illustrates implementing JMI interfaces as subclasses of handler classes in accordance with one embodiment of the present invention.

Turning now to FIG. 6, a block diagram that illustrates implementing JMI interfaces as subclasses of handler classes in accordance with one embodiment of the present invention is presented. A package proxy handler class 600 includes methods for obtaining proxies for a class, association or package. A class proxy handler class 605 includes methods for obtaining all class objects and creating a class instance. An instance proxy handler class 610 includes methods for getting and setting attribute and reference values. According to embodiments of the present invention, each JMI interface implementation is made a subclass of the corresponding package proxy handler class 600, class proxy handler class 605 or instance proxy handler class 610. Thus, a package proxy interface implementation 615 is a subclass of the package proxy handler class 600 that implements a particular package proxy interface, a class proxy interface implementation 620 is a subclass of the class proxy handler class 605 that implements a particular class proxy interface and a class instance implementation 625 is a subclass of the class instance proxy handler 610 that implements a particular instance interface.

Figure 7:
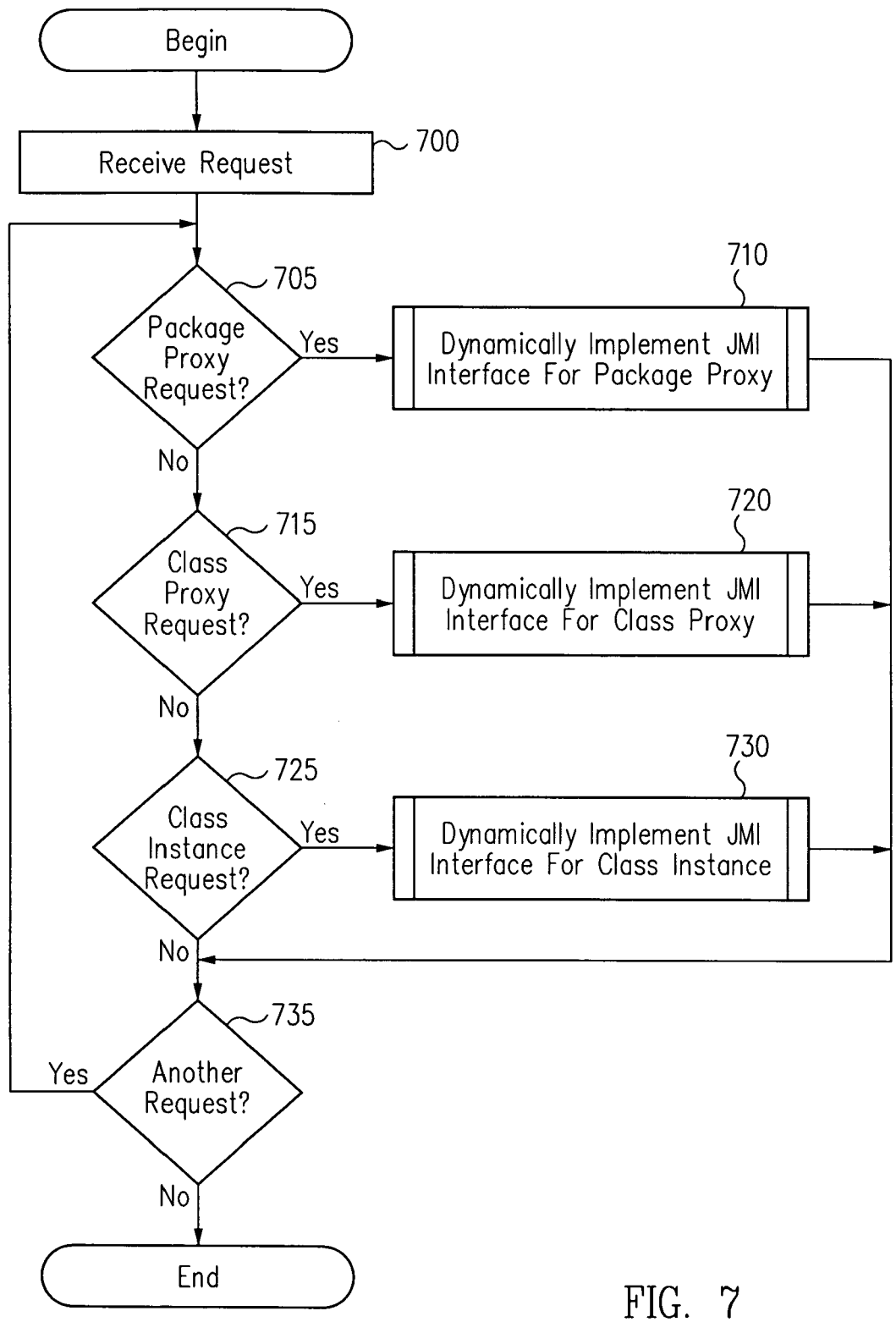
FIG. 7 is a flow diagram that illustrates a method for dynamic implementation of JMI interfaces in accordance with one embodiment of the present invention.

Turning now to FIG. 7, a flow diagram that illustrates a method for dynamic implementation of JMI interfaces in accordance with one embodiment of the present invention is presented. At 700, a JMI interface implementation request is received. At 705, a determination is made regarding whether a package proxy request has been received. If a package proxy request has been received, a JMI interface for the package proxy is dynamically implemented at 710. At 715, a determination is made regarding whether a class proxy request has been received. If a class proxy request has been received, a JMI interface for the class proxy is dynamically implemented at 720. At 725, a determination is made regarding whether an instance request has been received. If an instance request has been received, an instance is dynamically generated at 730. At 735, a determination is made regarding whether there is another request. If there is another request, it is processed beginning at reference numeral 705.

Figure 8:
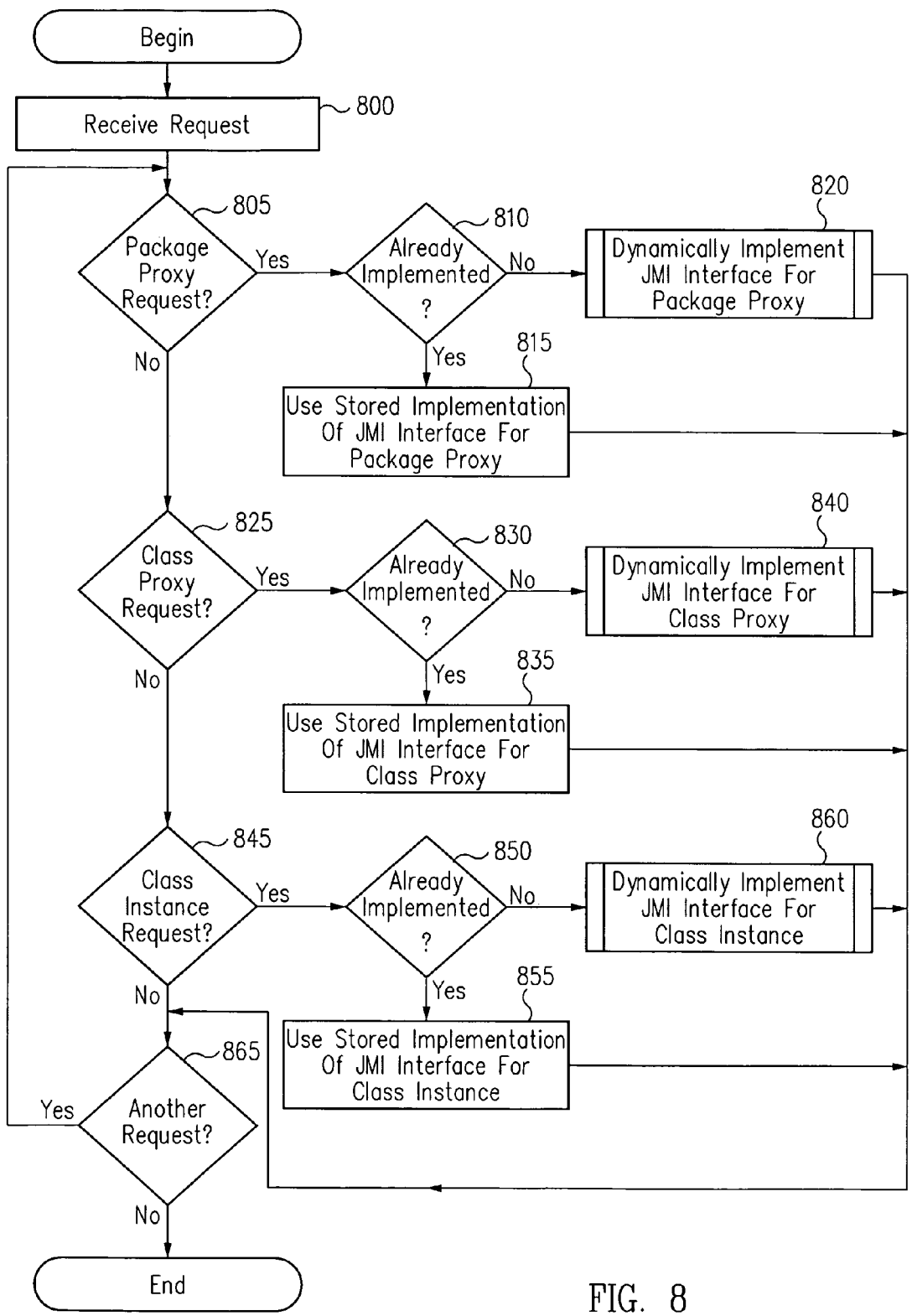
FIG. 8 is a flow diagram that illustrates a method for dynamic implementation of JMI interfaces in accordance with one embodiment of the present invention.

Turning now to FIG. 8, a flow diagram that illustrates a method for dynamic implementation of JMI interfaces in accordance with one embodiment of the present invention is presented. FIG. 8 is similar to FIG. 7, except that the embodiment illustrated by FIG. 8 implements a JMI interface the first time it is required and reuses the implementation thereafter. At 800, a JMI implementation request is received. At 805, a determination is made regarding whether a package proxy request has been received. If a package proxy request has been received, a determination is made at 810 regarding whether the JMI interface for the package proxy has been implemented. If the JMI interface has been implemented, the stored implementation is used at 815. If the JMI interface is unimplemented, a JMI interface for the package proxy is dynamically implemented at 820. At 825, a determination is made regarding whether a class proxy request has been received. If a class proxy request has been received, a determination is made at 830 regarding whether the JMI interface for the class proxy has been implemented. If the JMI interface has been implemented, the stored implementation is used at 835. If the JMI interface is unimplemented, a JMI interface for the class proxy is dynamically implemented at 840. At 845, a determination is made regarding whether a class instance request has been received. If a class instance request has been received, a determination is made at 850 regarding whether the JMI interface for the class instance has been implemented. If the JMI interface has been implemented, the stored implementation is used at 855. If the JMI interface is unimplemented, a JMI interface for the class instance is dynamically implemented at 860. At 865, a determination is made regarding whether there is another request. If there is another request, it is processed beginning at reference numeral 805.

FIGS. 9–22 are flow diagrams that provide more detail for the embodiments illustrated in FIG. 7 and FIG. 8.

Figure 9:
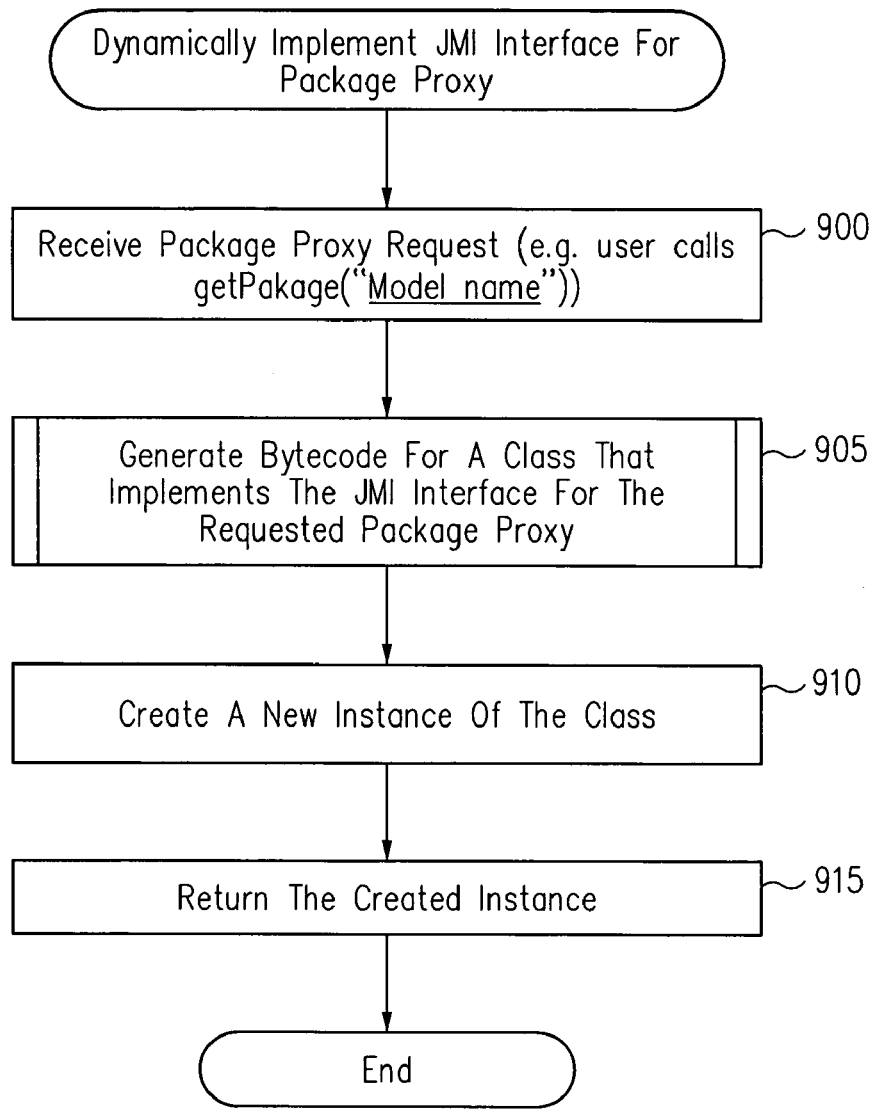
FIG. 9 is a flow diagram that illustrates a method for dynamic implementation of a JMI interface for a package proxy in accordance with one embodiment of the present invention.

Turning now to FIG. 9, a flow diagram that illustrates a method for dynamic implementation of a JMI interface for a package proxy in accordance with one embodiment of the present invention is presented. FIG. 9 provides more detail for reference numeral 710 of FIG. 7 and reference numeral 820 of FIG. 8. At 900, a package proxy request is received. The request may be received, by way of example, when a repository user requests a metamodel package. At 905, bytecode is generated for a class that implements the JMI interface generated for the requested package proxy. At 910, a new instance of the class that implements the JMI interface generated for the requested class proxy is created. At 915, the created instance is returned.

According to one embodiment of the present invention, the name of each interface method within a generated JMI package proxy interface is parsed to extract a class name. The requested metamodel package is searched for a class with the extracted class name. If a metamodel class is found, it is used to produce an implementation that returns the proxy for the class. This embodiment is described in more detail below with reference to FIG. 10.

Figure 10:
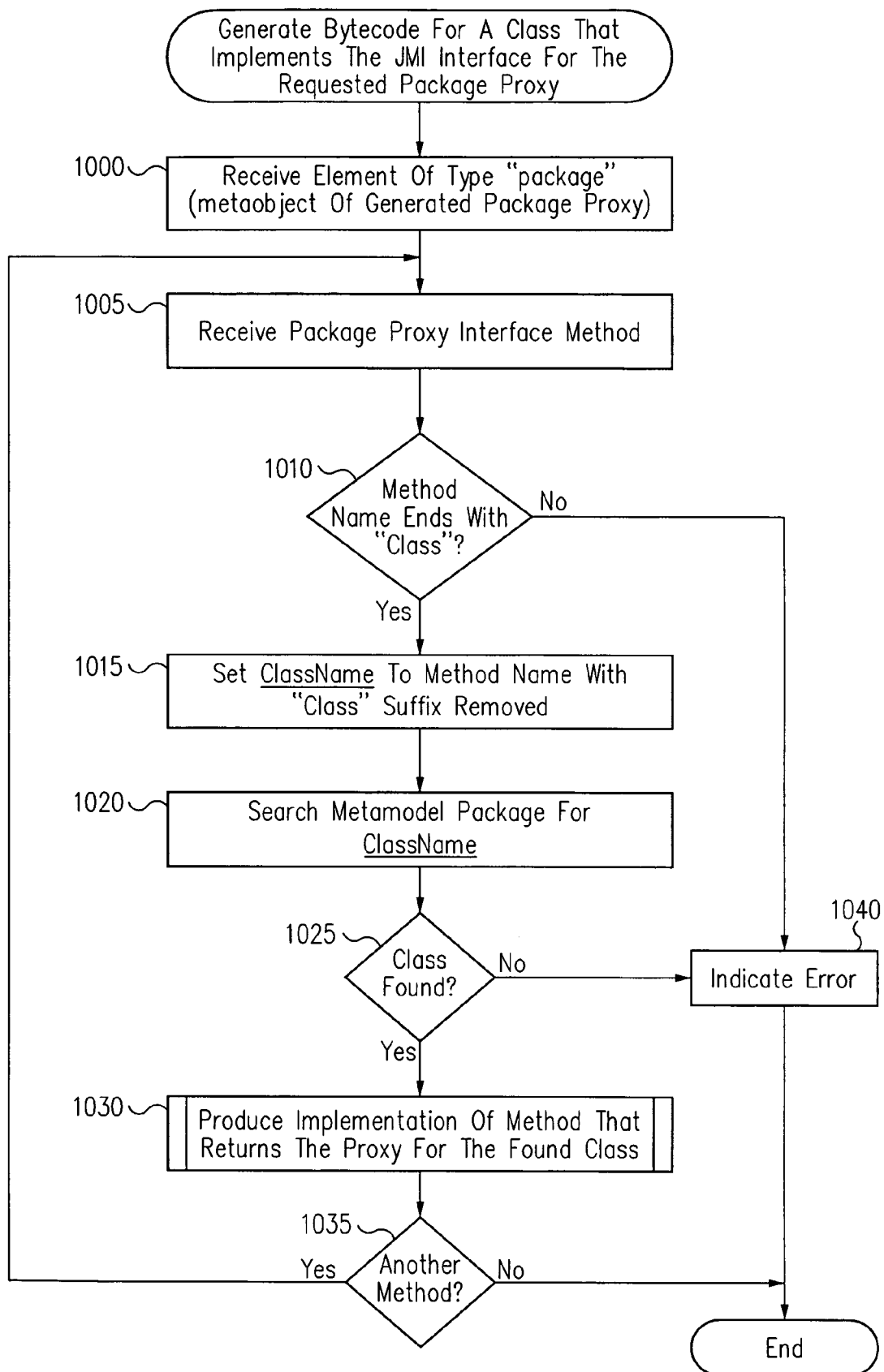
FIG. 10 is a flow diagram that illustrates a method for generating bytecode for a class that implements the JMI interface for a requested package proxy in accordance with one embodiment of the present invention.

Turning now to FIG. 10, a flow diagram that illustrates a method for generating bytecode for a class that implements the JMI interface for a requested package proxy in accordance with one embodiment of the present invention is presented. FIG. 10 provides more detail for reference numeral 905 of FIG. 9. At 1000, a metamodel element of type "Package" is received. The received metamodel package is the metaobject of the generated package proxy. At 1005, an interface method for the requested package proxy is received. At 1010, a determination is made regarding whether the method name ends with "Class". If the method name ends with "Class", at 1015, a variable ClassName is set to the method name with the "Class" suffix removed. At 1020, the metamodel package is searched for ClassName. At 1025, a determination is made regarding whether the class was found within the metamodel package. If the class was not found, or if the interface method name does not end with "Class", an error is indicated at 1040. If the class was found, at 1030, an implementation of a method that returns the proxy for the found class is produced. At 1035, a determination is made regarding whether another interface method remains. If there is another interface method, it is processed beginning at 1005.

Figure 11:
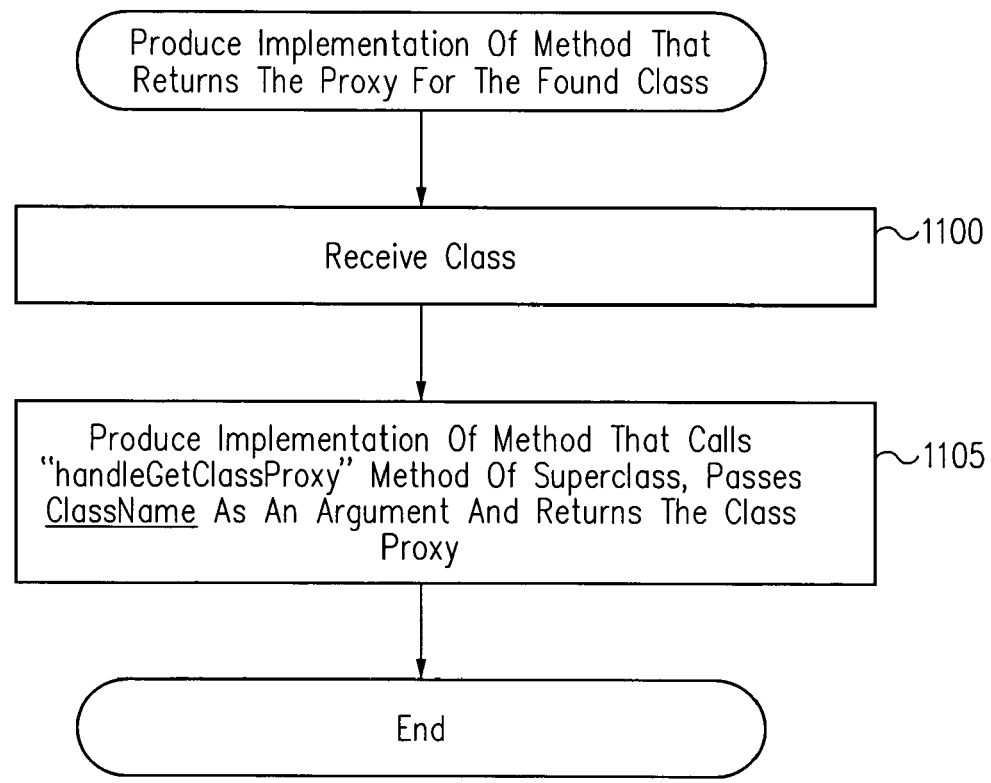
FIG. 11 is a flow diagram that illustrates a method for generating an implementation of a method that returns the proxy for a found class in accordance with one embodiment of the present invention.

Turning now to FIG. 11, a flow diagram that illustrates a method for producing an implementation of a method that returns the proxy for a found class in accordance with one embodiment of the present invention is presented. FIG. 11 provides more detail for reference numeral 1030 of FIG. 10. At 1100, the class is received. At 1105, an implementation of a method that returns the class proxy is produced. The implementation calls the "handleGetClassProxy" method of its superclass, passing the class name as an argument.

Figure 12:
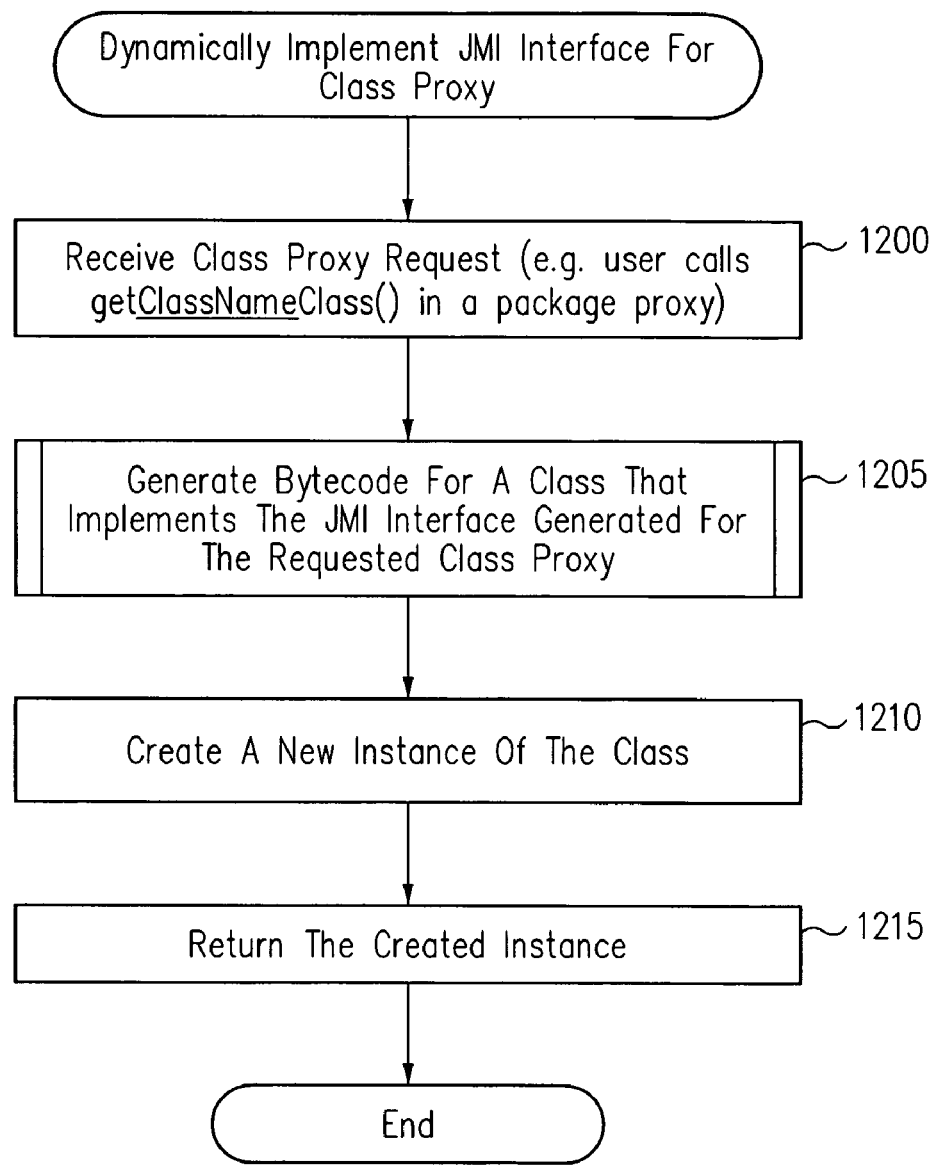
FIG. 12 is a flow diagram that illustrates a method for dynamic implementation of a JMI interface for a class proxy in accordance with one embodiment of the present invention.

Turning now to FIG. 12, a flow diagram that illustrates a method for dynamic implementation of a JMI interface for a class proxy in accordance with one embodiment of the present invention is presented. FIG. 12 provides more detail for reference numeral 720 of FIG. 7 and reference numeral 840 of FIG. 8. At 1200, a class proxy request is received. The request may be received, by way of example, when a repository user calls an accessor method (i.e. getClassNameClass( )) in a package proxy. At 1205, bytecode is generated for a class that implements the JMI interface generated for the requested class proxy. At 1210, a new instance of the class that implements the JMI interface generated for the requested class proxy is created. At 1215, the created instance is returned.

According to one embodiment of the present invention, the name of each interface method within a generated JMI class proxy interface is parsed to extract a class name. The extracted class name and a requested metamodel class is used to produce an implementation that creates a new instance of the class. This embodiment is described in more detail below with reference to FIG. 13.

Figure 13:
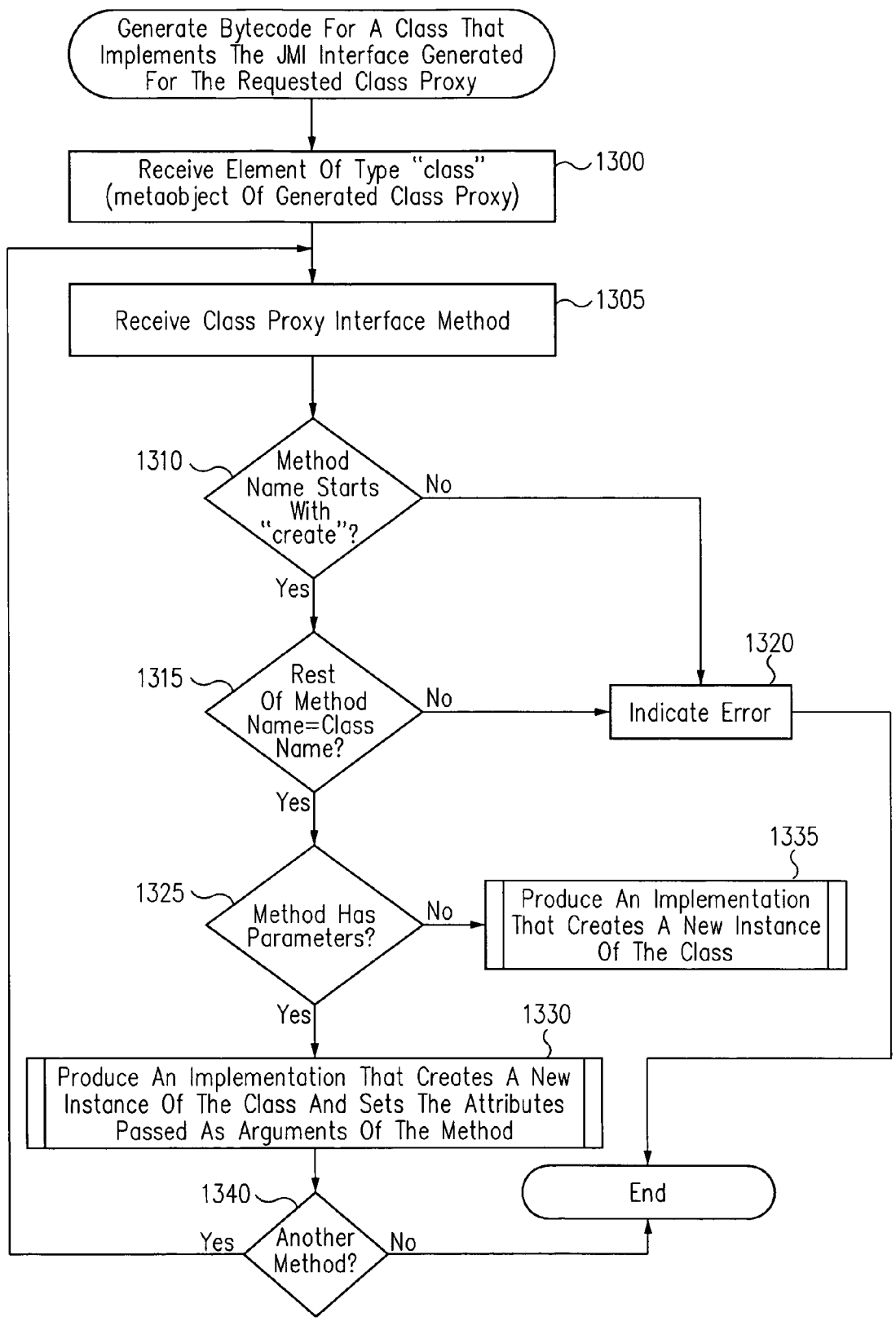
FIG. 13 is a flow diagram that illustrates a method for generating bytecode for a class that implements the JMI interface for a requested class proxy in accordance with one embodiment of the present invention.

Turning now to FIG. 13, a flow diagram that illustrates a method for generating bytecode for a class that implements the JMI interface generated for a requested class proxy is presented. FIG. 13 provides more detail for reference numeral 1205 of FIG. 12. At 1300, a metamodel element of type "Class" is received. The received class is the metaobject of the generated class proxy. At 1305, a class proxy interface method for the requested class proxy is received. At 1310, a determination is made regarding whether the interface method name begins with "create". If the interface method name begins with "create", at 1315, a determination is made regarding whether the remaining portion of the interface method name equals the class name. If the interface method name does not begin with "create" or if the rest of the interface method name is not equal to the class name, an error is indicated at 1320. Otherwise, at 1325, a determination is made regarding whether the interface method has parameters. If the interface method has parameters, at 1330, an implementation that creates a new instance of the class and sets the attributes passed as arguments of the method is produced. If the interface method has no parameters, at 1335, an implementation that creates a new instance of the class is produced. At 1340, a determination is made regarding whether another interface method remains. If there is another interface method, it is processed beginning at reference numeral 1305.

Figure 14:
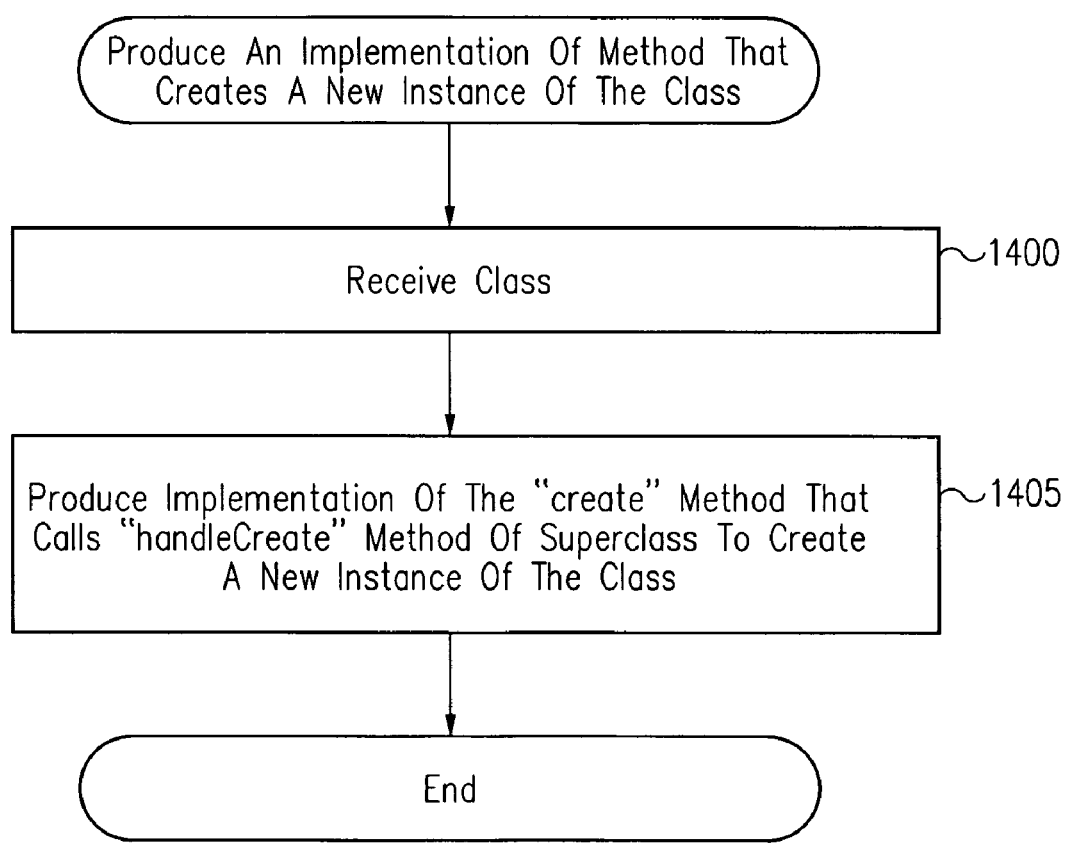
FIG. 14 is a flow diagram that illustrates a method for generating an implementation of a method that creates a new instance of a class in accordance with one embodiment of the present invention.

Turning now to FIG. 14, a flow diagram that illustrates a method for producing an implementation of a method that creates a new instance of a class in accordance with one embodiment of the present invention is presented. FIG. 14 provides more detail for reference numeral 1335 of FIG. 13. At 1400, a class is received. At 1405, an implementation of the "create" method that creates a new instance of the class is produced. The implementation calls the "handleCreate" method of its superclass to create a new instance of the class.

Figure 15:
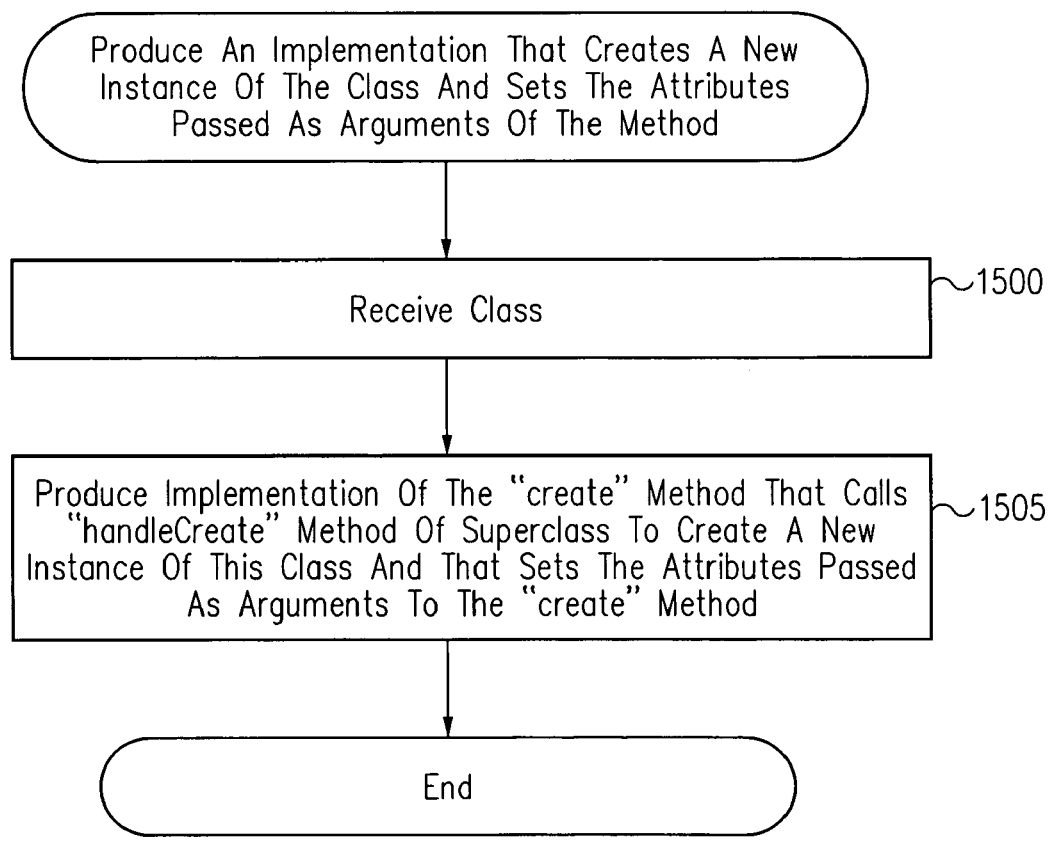
FIG. 15 is a flow diagram that illustrates a method for generating an implementation of a method that creates a new instance of a class and sets the attributes passed as arguments of the method in accordance with one embodiment of the present invention.

Turning now to FIG. 15, a flow diagram that illustrates a method for producing an implementation of a method that creates a new instance of a class in accordance with one embodiment of the present invention is presented. FIG. 15 provides more detail for reference numeral 1330 of FIG. 13. At 1500, a class is received. At 1505, an implementation of the "create" method that creates a new instance of the class is produced. The implementation calls the "handleCreate" method of its superclass to create a new instance of the class, setting the attributes passed as arguments of the method.

Figure 16:
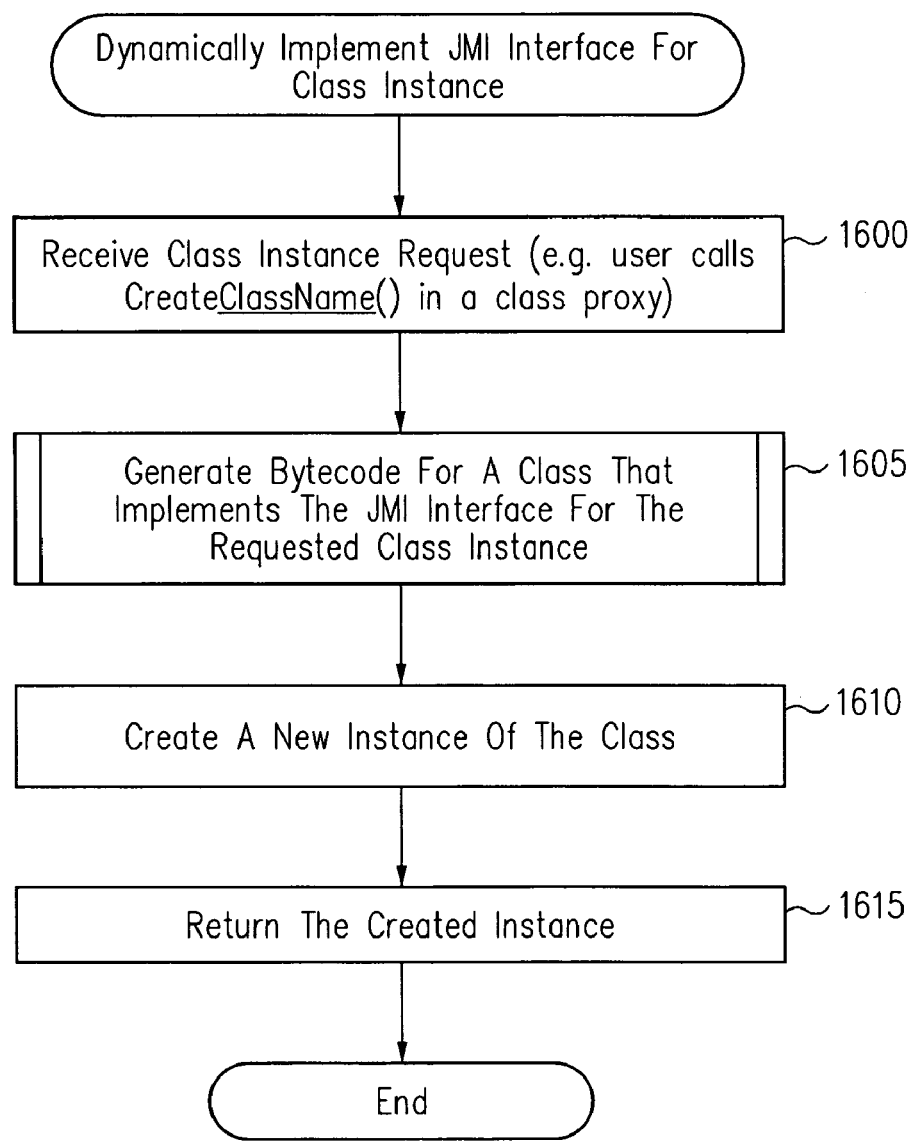
FIG. 16 is a flow diagram that illustrates a method for dynamic implementation of a JMI interface for a class instance in accordance with one embodiment of the present invention.

Turning now to FIG. 16, a flow diagram that illustrates a method for dynamic implementation of the JMI interface for a class instance in accordance with one embodiment of the present invention is presented. FIG. 16 provides more detail for reference numeral 730 of FIG. 7 and reference numeral 860 of FIG. 8. At 1600, a class instance request is received. The request may be received, by way of example, when a repository user calls a class "create" method of a class proxy. At 1605, bytecode for a class that implements the JMI interface for the requested class instance is generated. At 1610, a new instance of the class is created. At 1615, the created instance is returned.

According to one embodiment of the present invention, the name of each interface method within a generated JMI class instance interface is parsed to extract a prefix and a feature name. The prefix may be "set" or "get". An interface method without a prefix is interpreted as an operation. The feature name may be an attribute name or a reference name. If the prefix is "set" or "get", an implementation that sets or gets an attribute value or reference value is produced. If the prefix is not "set" or "get", an implementation that executes the operation is produced. This embodiment is described in more detail below with reference to FIG. 17.

Figure 17:
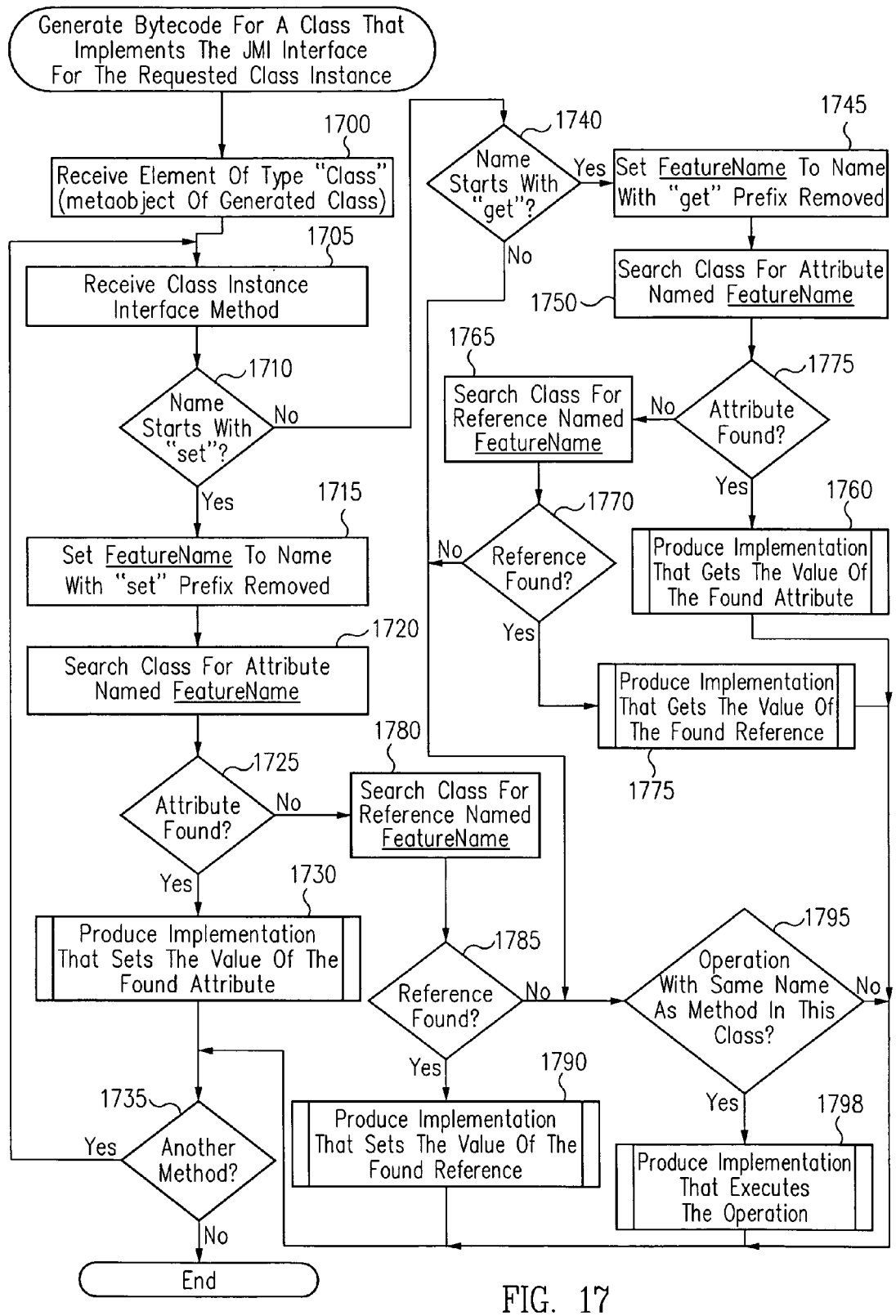
FIG. 17 is a flow diagram that illustrates a method for generating bytecode for a class that implements the JMI interface for a requested class instance in accordance with one embodiment of the present invention.

Turning now to FIG. 17, a flow diagram that illustrates a method for generating bytecode for a class that implements the JMI interface for a requested class instance in accordance with one embodiment of the present invention is presented. FIG. 17 provides more detail for reference numeral 1605 of FIG. 16. At 1700, a metamodel element of type "Class" is received. The received class is the metaobject of the generated class. At 1705, a class instance interface method is received. At 1710, a determination is made regarding whether the interface method name starts with "set". If the interface method name starts with "set", at 1715, the variable "FeatureName" is set to the interface method name with the "set" prefix removed. At 1720, the class is searched for an attribute with the same name as FeatureName. At 1725, a determination is made regarding whether the attribute was found. If the attribute was found, at 1730, an implementation that sets the value of the attribute is produced. At 1735, a determination is made regarding whether another method remains to be processed. If there is another method, processing resumes at 1705.

If at 1710 it is determined that the method name does not begin with "set", at 1740, a determination is made regarding whether the method name begins with "get". If the name starts with "get", at 1745, the variable "FeatureName" is set to the method name with the "get" prefix removed. At 1750, the class is searched for an attribute with the same name as FeatureName. At 1755, a determination is made regarding whether the attribute was found. If the attribute is found, at 1760, an implementation is produced that gets the value of the attribute. If the attribute is not found, at 1765, the class is searched for a reference with the same name as FeatureName. At 1770, a determination is made regarding whether the reference was found. If the reference is found, at 1775, an implementation that gets the value of the reference is produced.

If at 1725 an attribute is not found, at 1780, the class is searched for a reference with the same name as FeatureName. At 1785, a determination is made regarding whether the reference was found. If the reference was found, at 1790, an implementation that sets the value of the reference is produced. If the reference was not found, at 1795, a determination is made regarding whether an operation with the same name as the method name is in the class. If an operation with the same name as the method name is in the class, at 1798, an implementation that executes the operation is produced.

FIGS. 18–22 are flow diagrams that provide more detail for FIG. 17.

Figure 18:
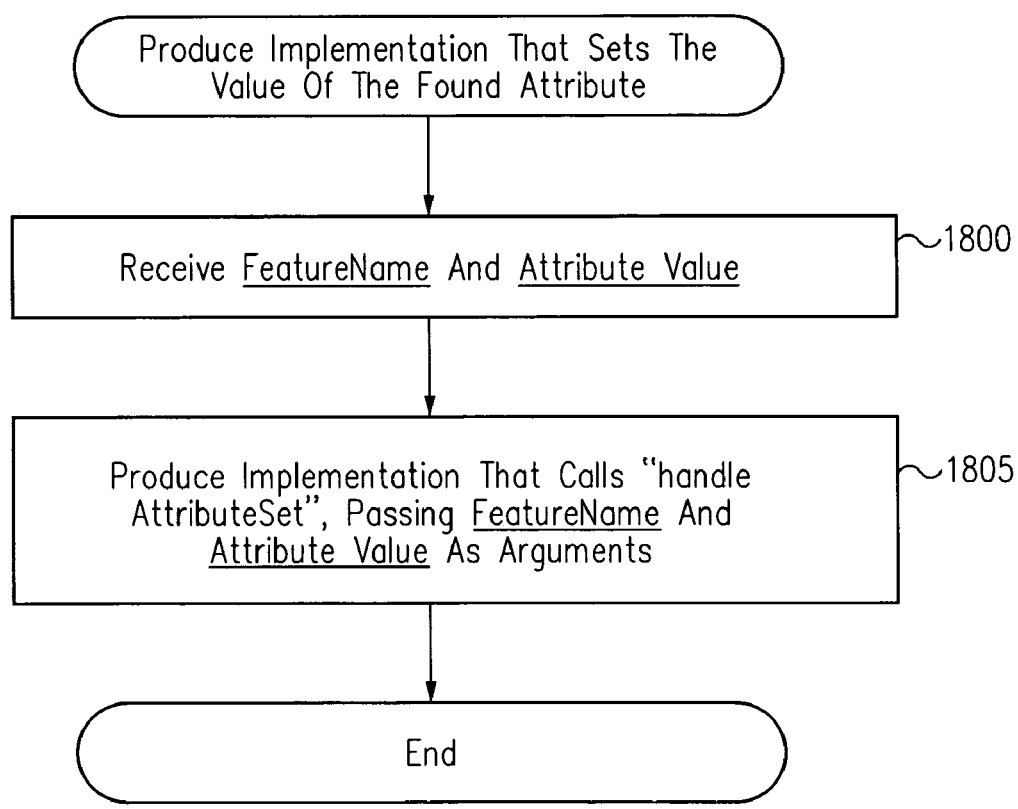
FIG. 18 is a flow diagram that illustrates a method for generating an implementation that sets the value of a found attribute in accordance with one embodiment of the present invention.

Turning now to FIG. 18, a method for generating an implementation that sets the value of an attribute in accordance with one embodiment of the present invention is presented. FIG. 18 provides more detail for reference numeral 1730 of FIG. 17. At 1800, a feature name and an attribute value are received. At 1805, an implementation that calls the "handleAttributeSet" method of its superclass is produced. The implementation passes the feature name and the attribute value as arguments.

Figure 19:
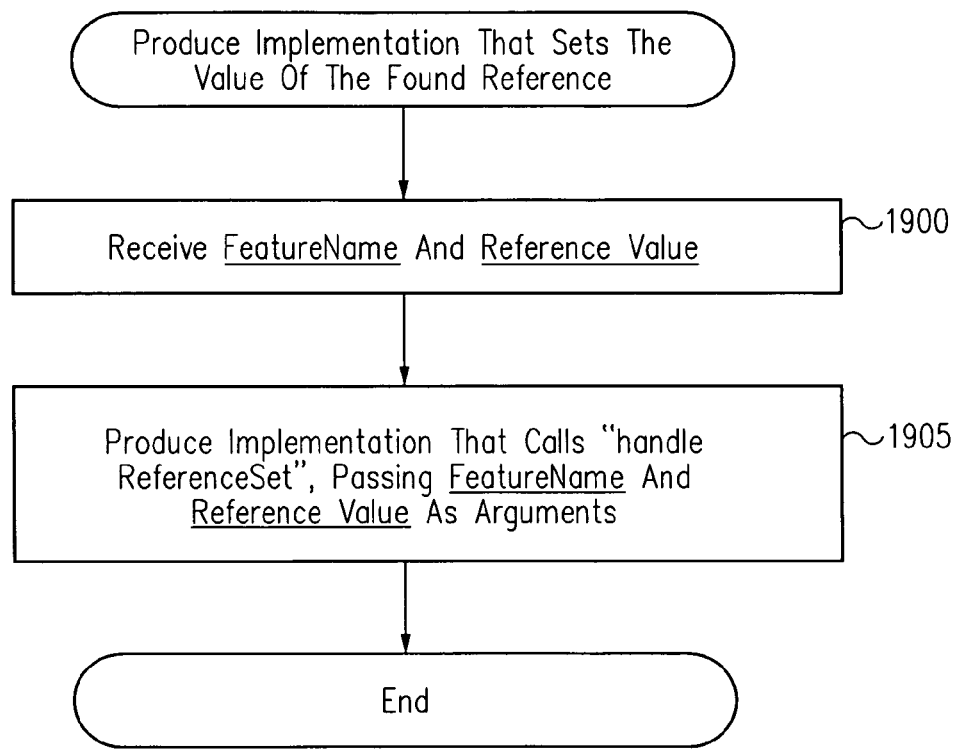
FIG. 19 is a flow diagram that illustrates a method for generating an implementation that sets the value of a found reference in accordance with one embodiment of the present invention.

Turning now to FIG. 19, a method for generating an implementation that sets the value of a reference in accordance with one embodiment of the present invention is presented. FIG. 19 provides more detail for reference numeral 1790 of FIG. 17. At 1900, a feature name and an attribute value are received. At 1905, an implementation that calls the "handleReferenceSet" method of its superclass is produced. The implementation passes the feature name and the reference value as arguments.

Figure 20:
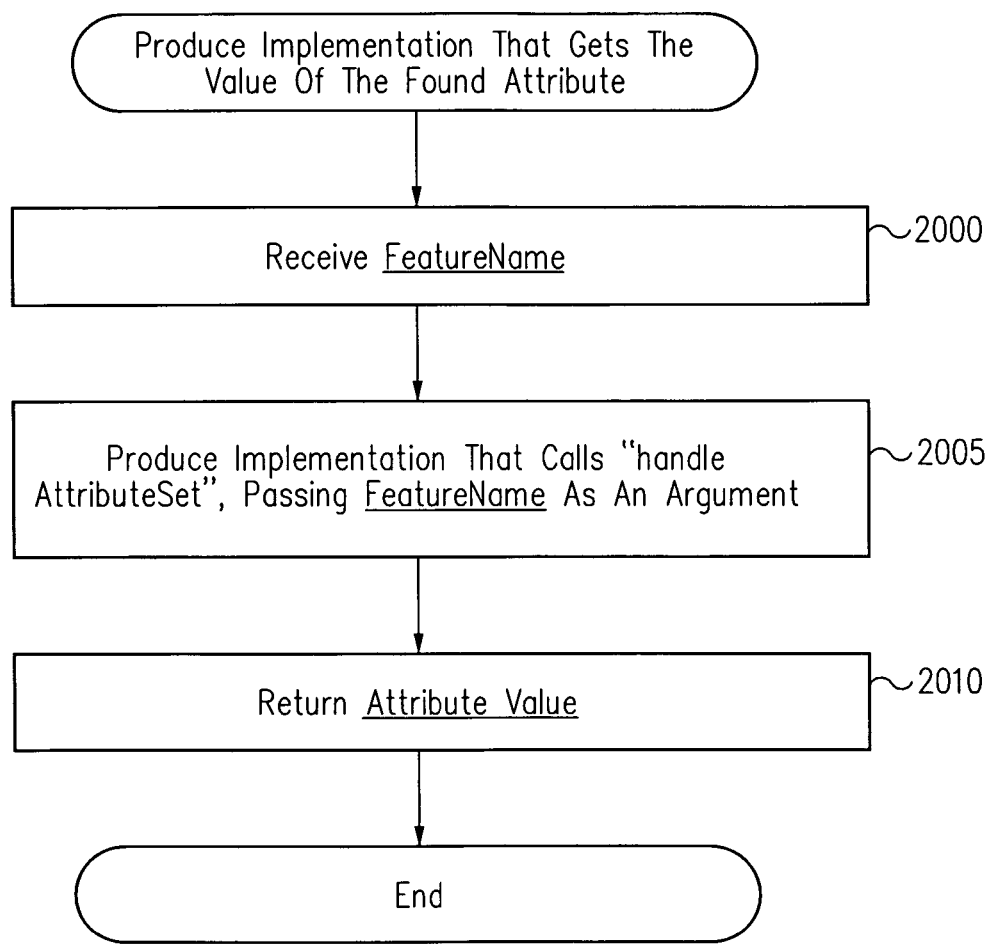
FIG. 20 is a flow diagram that illustrates a method for generating an implementation that gets the value of a found attribute in accordance with one embodiment of the present invention.

Turning now to FIG. 20, a method for generating an implementation that gets the value of an attribute in accordance with one embodiment of the present invention is presented. FIG. 20 provides more detail for reference numeral 1760 of FIG. 17. At 2000, a feature name is received. At 2005, an implementation that calls the "handleAttributeGet" method of its superclass is produced. The implementation passes the feature name as an argument and returns an attribute value. At 2010, the attribute value is returned.

Figure 21:
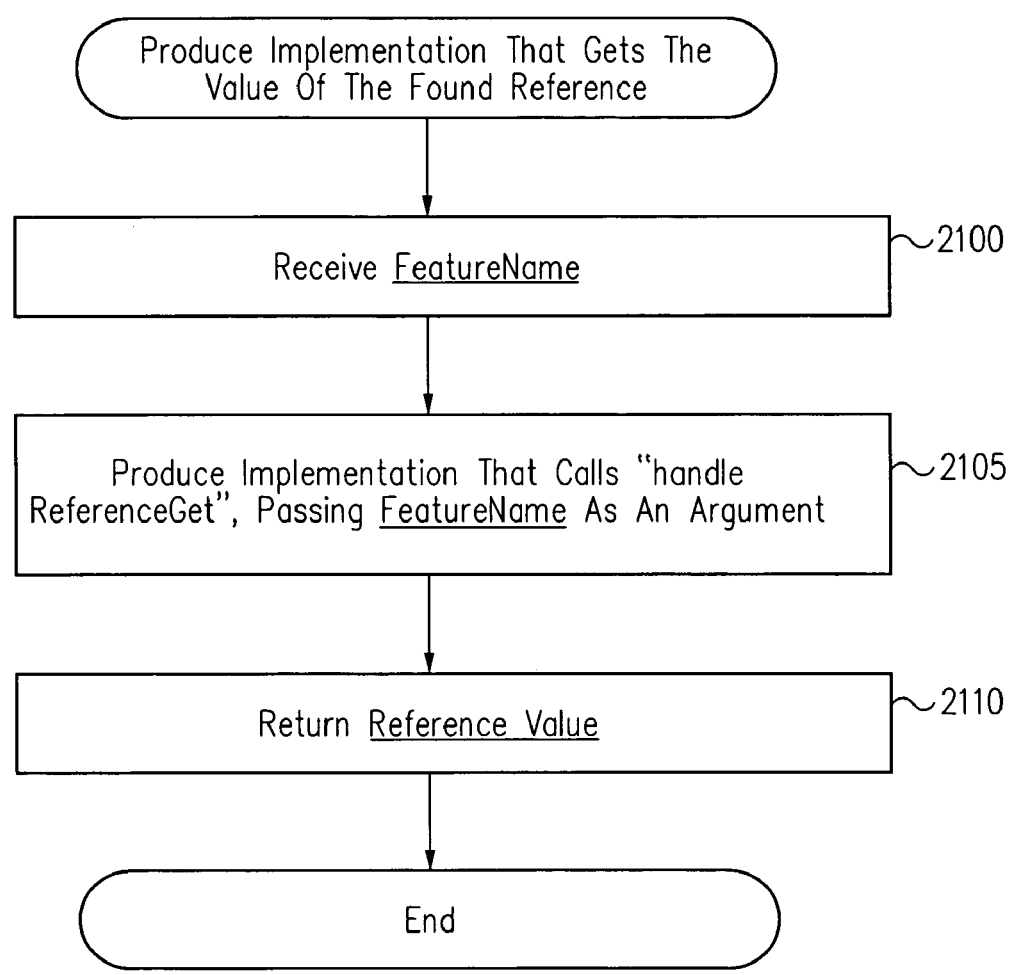
FIG. 21 is a flow diagram that illustrates a method for generating an implementation that gets the value of a found reference in accordance with one embodiment of the present invention.

Turning now to FIG. 21, a method for generating an implementation that gets the value of a reference in accordance with one embodiment of the present invention is presented. FIG. 21 provides more detail for reference numeral 1775 of FIG. 17. At 2100, a feature name is received. At 2105, an implementation that calls the "handleReferenceGet" method of its superclass is produced. The implementation passes the feature name as an argument and returns a reference value. At 2110, the reference value is returned.

Figure 22:
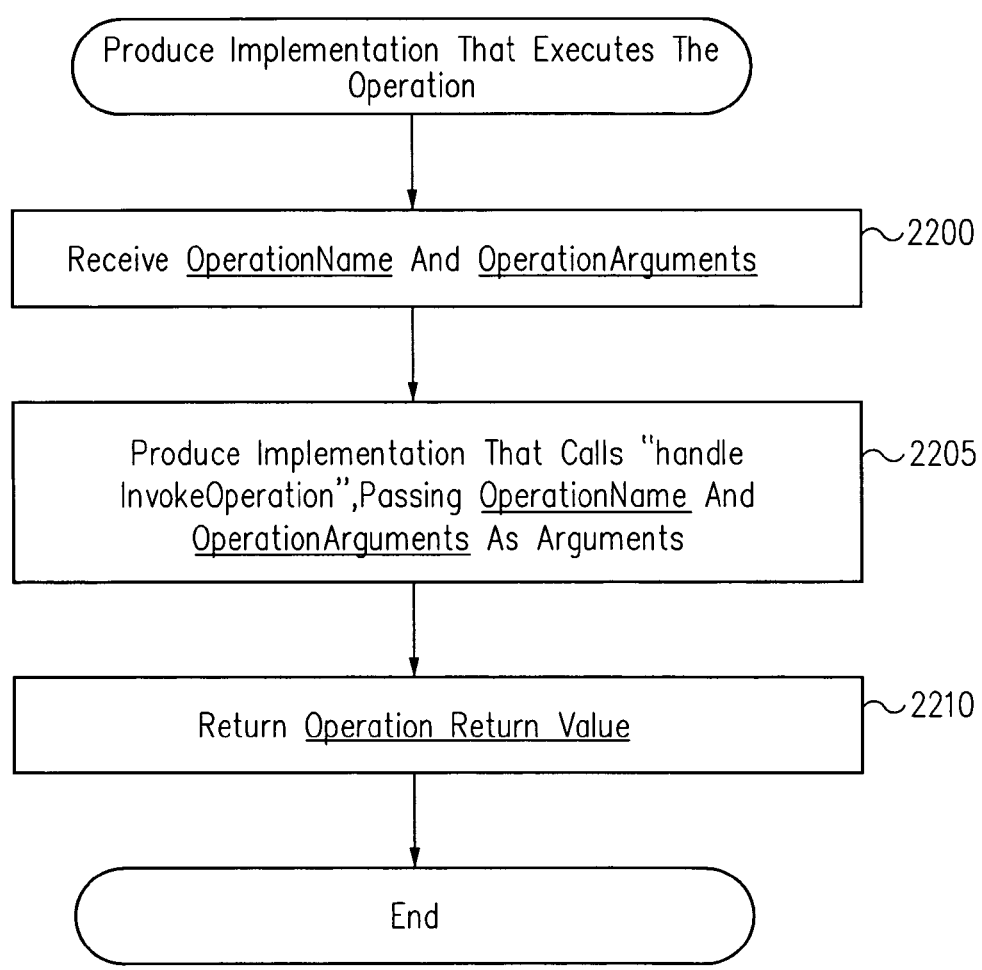
FIG. 22 is a flow diagram that illustrates a method for generating an implementation that executes an operation in accordance with one embodiment of the present invention.

Turning now to FIG. 22, a flow diagram that illustrates a method for generating an implementation that executes an operation in accordance with one embodiment of the present invention is presented. FIG. 22 provides more detail for reference numeral 1798 of FIG. 17. At 2200, an operation name and associated operation arguments are received. At 2205, an implementation that calls the "handleInvokeOperation" method of its superclass is produced. The operation name and associated operation arguments are passed as parameters to the "handleInvokeOperation" method. At 2210, the operation return value is returned.

Embodiments of the present invention provide a number of important advantages. The repository user only needs to generate interfaces, and the implementations of those interfaces are implemented automatically at run-time, thus reducing the amount of manual coding. The dynamic implementation generator may be changed without requiring recompilation of interface methods, thus increasing repository flexibility.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer-implemented method for dynamic implementation of a Java™ Metadata Interface (JMI) to a metamodel, the computer-implemented method comprising:
   receiving a JMI implementation request, said request associated with a metamodel, said metamodel comprising at least one package, said at least one package comprising at least one class, said at least one class comprising at least one attribute, reference or operation;
   implementing, dynamically and automatically at runtime, a package proxy JMI interface when said request comprises a package proxy request;
   implementing, dynamically and automatically at runtime, a class proxy JMI interface when said request comprises a class proxy request; and
   implementing, dynamically and automatically at runtime, a class instance JMI interface when said request comprises a class instance request wherein said implementing operations are performed separately and independently based upon said request.

2. The computer-implemented method of claim 1 wherein said implementing a package proxy JMI interface comprises:
   generating bytecode for a class that implements said package proxy JMI interface;
   creating a new instance of said class; and
   returning said instance.

3. The computer-implemented method of claim 1 wherein said implementing a class proxy JMI interface comprises:
   generating bytecode for a class that implements said class proxy JMI interface;
   creating a new instance of said class; and
   returning said instance.

4. The computer-implemented method of claim 1 wherein said implementing a class instance JMI interface comprises:
   generating bytecode for a class that implements said class instance JMI interface;
   creating a new instance of said class; and
   returning said instance.

5. A computer-implemented method for dynamic implementation of a Java™ Metadata Interface (JMI) to a metamodel, the computer-implemented method comprising:
   receiving a JMI implementation request, said request associated with a metamodel, said metamodel comprising at least one package, said at least one package comprising at least one class, said at least one class comprising at least one attribute, reference or operation;
   implementing a package proxy JMI interface when said request comprises a package proxy request wherein said implementing a package proxy JMI interface comprises:
      generating bytecode for a class that implements said package proxy JMI interface wherein said generating further comprises:
         receiving a metamodel package;
         receiving a package proxy interface method associated with said metamodel package;
         determining a class name based upon said interface method;
         searching said metamodel package for a class corresponding to said class name; and
         producing an implementation of said interface method that returns a proxy for said class when said class name is found in said metamodel package;

creating a new instance of said class; and
returning said instance;
implementing a class proxy JMI interface when said request comprises a class proxy request; and
implementing a class instance JMI interface when said request comprises a class instance request.

6. The computer-implemented method of claim 5 wherein said implementation of said interface method calls a handler method of a superclass of said class, passing said class name as an argument and returning the proxy for said class.

7. A computer-implemented method for dynamic implementation of a Java™ Metadata Interface (JMI) to a metamodel, the computer-implemented method comprising:
receiving a JMI implementation request, said request associated with a metamodel, said metamodel comprising at least one package, said at least one package comprising at least one class, said at least one class comprising at least one attribute, reference or operation;
implementing a package proxy JMI interface when said request comprises a package proxy request;
implementing a class proxy JMI interface when said request comprises a class proxy request wherein said implementing a class proxy JMI interface comprises:
generating bytecode for a class that implements said class proxy JMI interface wherein said generating further comprises:
receiving a metamodel class;
receiving a class proxy interface method associated with said metamodel class;
producing a first implementation of said interface method that creates a new instance of said class when said interface method is parameterless; and
producing a second implementation of said interface method that creates a new instance of said class and sets attributes passed as arguments to said interface method when said interface method includes at least one parameter;
creating a new instance of said class; and
returning said instance; and
implementing a class instance JMI interface when said request comprises a class instance request wherein said implementing operations are performed separately and independently based upon said request.

8. The computer-implemented method of claim 7 wherein said first implementation calls a handler method of a superclass of said class, passing said class name as an argument and returning a new instance of said class.

9. The computer-implemented method of claim 7 wherein said second implementation calls a handler method of a superclass of said class, passing said class name, said attributes, and attribute values as arguments and returning a new instance of said class.

10. A computer-implemented method for dynamic implementation of a Java™ Metadata Interface (JMI) to a metamodel, the computer-implemented method comprising:
receiving a JMI implementation request, said request associated with a metamodel, said metamodel comprising at least one package, said at least one package comprising at least one class, said at least one class comprising at least one attribute, reference or operation;
implementing a package proxy JMI interface when said request comprises a package proxy request;
implementing a class proxy JMI interface when said request comprises a class proxy request; and
implementing a class instance JMI interface when said request comprises a class instance request wherein said implementing a class instance JMI interface comprises:
generating bytecode for a class that implements said class instance JMI interface wherein said generating further comprises:
receiving a metamodel class;
receiving a class instance interface method associated with said metamodel class, said interface method having an interface method name;
producing a first implementation of said interface method that sets the value of an attribute when said interface method name includes a first prefix and when the attribute associated with said interface method is found in said metamodel class;
producing a second implementation of said interface method that sets the value of a reference when said interface method name includes a first prefix and when the reference associated with said interface method is found in said metamodel class;
producing a third implementation of said interface method that gets the value of an attribute when said interface method name includes a second prefix and when the attribute associated with said interface method is found in said metamodel class;
producing a fourth implementation of said interface method that gets the value of a reference when said interface method name includes a second prefix and when the reference associated with said interface method is found in said metamodel class; and
producing a fifth implementation of said interface method that executes an operation when said interface method has the same name as said operation; and
creating a new instance of said class; and
returning said instance.

11. The computer-implemented method of claim 10 wherein
said first prefix is "set"; and
said second prefix is "get".

12. The computer-implemented method of claim 10 wherein said producing a first implementation further comprises:
receiving an attribute name and an attribute value; and
producing an implementation that calls a handler method of a superclass of said class, passing said attribute name and said attribute value as arguments.

13. The computer-implemented method of claim 10 wherein said producing a second implementation further comprises:
receiving a reference name and an reference value; and
producing an implementation that calls a handler method of a superclass of said class, passing said reference name and said reference value as arguments.

14. The computer-implemented method of claim 10 wherein said producing a third implementation further comprises:
receiving an attribute name;
producing an implementation that calls a handler method of a superclass of said class, passing said attribute name as an argument and returning the attribute value associated with said attribute name; and
returning said attribute value.

15. The computer-implemented method of claim 10 wherein said producing a fourth implementation further comprises:

receiving a reference name;
producing an implementation that calls a handler method of a superclass of said class, passing said reference name as an argument and returning the reference value associated with said reference name; and
returning said reference value.

16. The computer-implemented method of claim 10 wherein said producing a fifth implementation further comprises:
receiving an operation name and any associated arguments;
producing an implementation that calls a handler method of a superclass of said class, passing said operation name and said associated arguments as arguments and returning an operation return value; and
returning said operation return value.

17. A computer-implemented method for dynamic implementation of a Java™ Metadata Interface (JMI), the computer-implemented method comprising:
receiving a JMI implementation request, said request associated with a metamodel, said metamodel comprising at least one package, said at least one package comprising at least one class, said at least one class comprising at least one attribute, reference or operation;
implementing, dynamically and automatically at runtime, a JMI interface when said JMI interface is unimplemented; and
executing a stored JMI interface implementation when said JMI interface is implemented, wherein
said implementing further comprises:
implementing a package proxy JMI interface when said request comprises a package proxy request and when said package proxy JMI interface is unimplemented;
implementing a class proxy JMI interface when said request comprises a class proxy request and when said class proxy JMI interface is unimplemented; and
implementing a class instance JMI interface when said request comprises a class instance request and when said class instance JMI interface is unimplemented; and
said executing further comprises:
executing a stored a package proxy JMI interface implementation when said request comprises a package proxy request and when said package proxy JMI interface is implemented;
executing a stored class proxy JMI interface when said request comprises a class proxy request and when said class proxy JMI interface is implemented; and
executing a stored class instance JMI interface when said request comprises a class instance request and when said class instance JMI interface is implemented.

18. The computer-implemented method of claim 17 wherein said implementing a package proxy JMI interface comprises:
generating bytecode for a class that implements said package proxy JMI interface;
creating a new instance of said class; and
returning said instance.

19. The computer-implemented method of claim 17 wherein said implementing a class proxy JMI interface comprises:
generating bytecode for a class that implements said class proxy JMI interface;
creating a new instance of said class; and
returning said instance.

20. The computer-implemented method of claim 17 wherein said implementing a class instance JMI interface comprises:
generating bytecode for a class that implements said class instance JMI interface;
creating a new instance of said class; and
returning said instance.

21. A computer-implemented method for dynamic implementation of a Java™ Metadata Interface (JMI), the computer-implemented method comprising:
receiving a JMI implementation request, said request associated with a metamodel, said metamodel comprising at least one package, said at least one package comprising at least one class, said at least one class comprising at least one attribute, reference or operation;
implementing a JMI interface when said JMI interface is unimplemented, wherein said implementing further comprises:
implementing a package proxy JMI interface when said request comprises a package proxy request and when said package proxy JMI interface is unimplemented wherein said implementing a package proxy JMI interface comprises:
generating bytecode for a class that implements said package proxy JMI interface wherein said generating further comprises:
receiving a metamodel package;
receiving a package proxy interface method associated with said metamodel package;
determining a class name based upon said interface method;
searching said metamodel package for a class corresponding to said class name; and
producing an implementation of said interface method that returns a proxy for said class when said class name is found in said metamodel package;
creating a new instance of said class; and
returning said instance;
implementing a class proxy JMI interface when said request comprises a class proxy request and when said class proxy JMI interface is unimplemented; and
implementing a class instance JMI interface when said request comprises a class instance request and when said class instance JMI interface is unimplemented; and
executing a stored JMI interface implementation when said JMI interface is implemented wherein said executing further comprises:
executing a stored a package proxy JMI interface implementation when said request comprises a package proxy request and when said package proxy JMI interface is implemented;
executing a stored class proxy JMI interface when said request comprises a class proxy request and when said class proxy JMI interface is implemented; and
executing a stored class instance JMI interface when said request comprises a class instance request and when said class instance JMI interface is implemented.

22. The computer-implemented method of claim 21 wherein said implementation of said interface method calls a handler method of a superclass of said class, passing said class name as an argument and returning the proxy for said class.

23. A computer-implemented method for dynamic implementation of a Java™ Metadata Interface (JMI), the computer-implemented method comprising:
receiving a JMI implementation request, said request associated with a metamodel, said metamodel comprising at least one package, said at least one package comprising at least one class, said at least one class comprising at least one attribute, reference or operation;
implementing a JMI interface when said JMI interface is unimplemented, wherein said implementing further comprises:
implementing a package proxy JMI interface when said request comprises a package proxy request and when said package proxy JMI interface is unimplemented;
implementing a class proxy JMI interface when said request comprises a class proxy request and when said class proxy JMI interface is unimplemented wherein said implementing a class proxy JMI interface comprises:
generating bytecode for a class that implements said class proxy JMI interface wherein said generating further comprises:
receiving a metamodel class;
receiving a class proxy interface method associated with said metamodel class;
producing a first implementation of said interface method that creates a new instance of said class when said interface method is parameterless; and
producing a second implementation of said interface method that creates a new instance of said class and sets attributes passed as arguments to said interface method when said interface method includes at least one parameter;
creating a new instance of said class; and
returning said instance; and
implementing a class instance JMI interface when said request comprises a class instance request and when said class instance JMI interface is unimplemented; and
executing a stored JMI interface implementation when said JMI interface is implemented wherein said executing further comprises:
executing a stored a package proxy JMI interface implementation when said request comprises a package proxy request and when said package proxy JMI interface is implemented;
executing a stored class proxy JMI interface when said request comprises a class proxy request and when said class proxy JMI interface is implemented; and
executing a stored class instance JMI interface when said request comprises a class instance request and when said class instance JMI interface is implemented.

24. The computer-implemented method of claim 23 wherein said first implementation calls a handler method of a superclass of said class, passing said class name as an argument and returning a new instance of said class.

25. The computer-implemented method of claim 23 wherein said second implementation calls a handler method of a superclass of said class, passing said class name, said attributes, and attribute values as arguments and returning a new instance of said class.

26. A computer-implemented method for dynamic implementation of a Java™ Metadata Interface (JMI), the computer-implemented method comprising:
receiving a JMI implementation request, said request associated with a metamodel, said metamodel comprising at least one package, said at least one package comprising at least one class, said at least one class comprising at least one attribute, reference or operation;
implementing a JMI interface when said JMI interface is unimplemented, wherein said implementing further comprises:
implementing a package proxy JMI interface when said request comprises a package proxy request and when said package proxy JMI interface is unimplemented;
implementing a class proxy JMI interface when said request comprises a class proxy request and when said class proxy JMI interface is unimplemented; and
implementing a class instance JMI interface when said request comprises a class instance request and when said class instance JMI interface is unimplemented wherein said implementing a class instance JMI interface comprises:
generating bytecode for a class that implements said class instance JMI interface wherein said generating further comprises:
receiving a metamodel class;
receiving a class instance interface method associated with said metamodel class, said interface method having an interface method name;
producing a first implementation of said interface method that sets the value of an attribute when said interface method name includes a first prefix and when the attribute associated with said interface method is found in said metamodel class;
producing a second implementation of said interface method that sets the value of a reference when said interface method name includes a first prefix and when the reference associated with said interface method is found in said metamodel class;
producing a third implementation of said interface method that gets the value of an attribute when said interface method name includes a second prefix and when the attribute associated with said interface method is found in said metamodel class;
producing a fourth implementation of said interface method that gets the value of a reference when said interface method name includes a second prefix and when the reference associated with said interface method is found in said metamodel class; and
producing a fifth implementation of said interface method that executes an operation when said interface method has the same name as said operation;
creating a new instance of said class; and
returning said instance; and
executing a stored JMI interface implementation when said JMI interface is implemented wherein said executing further comprises:
executing a stored a package proxy JMI interface implementation when said request comprises a package proxy request and when said package proxy JMI interface is implemented;

executing a stored class proxy JMI interface when said request comprises a class proxy request and when said class proxy JMI interface is implemented; and executing a stored class instance JMI interface when said request comprises a class instance request and when said class instance JMI interface is implemented.

27. The computer-implemented method of claim 26 wherein said first prefix is "set"; and said second prefix is "get".

28. The computer-implemented method of claim 26 wherein said producing a first implementation further comprises:

receiving an attribute name and an attribute value; and producing an implementation that calls a handler method of a superclass of said class, passing said attribute name and said attribute value as arguments.

29. The computer-implemented method of claim 26 wherein said producing a second implementation further comprises:

receiving a reference name and an reference value; and producing an implementation that calls a handler method of a superclass of said class, passing said reference name and said reference value as arguments.

30. The computer-implemented method of claim 26 wherein said producing a third implementation further comprises:

receiving an attribute name;

producing an implementation that calls a handler method of a superclass of said class, passing said attribute name as an argument and returning the attribute value associated with said attribute name; and returning said attribute value.

31. The computer-implemented method of claim 26 wherein said producing a fourth implementation further comprises:

receiving a reference name;

producing an implementation that calls a handler method of a superclass of said class, passing said reference name as an argument and returning the reference value associated with said reference name; and returning said reference value.

32. The computer-implemented method of claim 26 wherein said producing a fifth implementation further comprises:

receiving an operation name and any associated arguments;

producing an implementation that calls a handler method of a superclass of said class, passing said operation name and said associated arguments as arguments and returning an operation return value; and returning said operation return value.

33. A program storage device readable by a machine, embodying a program of instructions executable by the machine to perform a method to dynamically implement a Java™ Metadata Interface (JMI) to a metamodel, the method comprising:

receiving a JMI implementation request, said request associated with a metamodel, said metamodel comprising at least one package, said at least one package comprising at least one class, said at least one class comprising at least one attribute, reference or operation;

implementing, dynamically and automatically at runtime, a package proxy JMI interface when said request comprises a package proxy request;

implementing, dynamically and automatically at runtime, a class proxy JMI interface when said request comprises a class proxy request; and implementing, dynamically and automatically at runtime, a class instance JMI interface when said request comprises a class instance request wherein said implementing operations are performed separately and independently based upon said request.

34. The program storage device of claim 33 wherein said implementing a package proxy JMI interface comprises:

generating bytecode for a class that implements said package proxy JMI interface;

creating a new instance of said class; and returning said instance.

35. A program storage device readable by a machine, embodying a program of instructions executable by the machine to perform a method to dynamically implement a Java™ Metadata Interface (JMI) to a metamodel, the method comprising:

receiving a JMI implementation request, said request associated with a metamodel, said metamodel comprising at least one package, said at least one package comprising at least one class, said at least one class comprising at least one attribute, reference or operation;

implementing a package proxy JMI interface when said request comprises a package proxy request wherein said implementing a package proxy JMI interface comprises:

generating bytecode for a class that implements said package proxy JMI interface wherein said generating further comprises:

receiving a metamodel package;

receiving a package proxy interface method associated with said metamodel package;

determining a class name based upon said interface method;

searching said metamodel package for a class corresponding to said class name; and producing an implementation of said interface method that returns a proxy for said class when said class name is found in said metamodel package;

creating a new instance of said class; and returning said instance;

implementing a class proxy JMI interface when said request comprises a class proxy request; and implementing a class instance JMI interface when said request comprises a class instance request.

36. The program storage device of claim 35 wherein said implementation of said interface method calls a handler method of a superclass of said class, passing said class name as an argument and returning the proxy for said class.

37. The program storage device of claim 35 wherein said implementing a class proxy JMI interface comprises:

generating bytecode for a class that implements said class proxy JMI interface;

creating a new instance of said class; and returning said instance.

38. The program storage device of claim 37 wherein said generating further comprises:

receiving a metamodel class;

receiving a class proxy interface method associated with said metamodel class;

producing a first implementation of said interface method that creates a new instance of said class when said interface method is parameterless; and producing a second implementation of said interface method that creates a new instance of said class and sets attributes passed as arguments to said interface method when said interface method includes at least one parameter.

39. The program storage device of claim 38 wherein said first implementation calls a handler method of a superclass of said class, passing said class name as an argument and returning a new instance of said class.

40. The program storage device of claim 38 wherein said second implementation calls a handler method of a superclass of said class, passing said class name, said attributes, and attribute values as arguments and returning a new instance of said class.

41. The program storage device of claim 35 wherein said implementing a class instance JMI interface comprises:
    generating bytecode for a class that implements said class instance JMI interface;
    creating a new instance of said class; and
    returning said instance.

42. The program storage device of claim 41 wherein said generating further comprises:
    receiving a metamodel class;
    receiving a class instance interface method associated with said metamodel class, said interface method having an interface method name;
    producing a first implementation of said interface method that sets the value of an attribute when said interface method name includes a first prefix and when the attribute associated with said interface method is found in said metamodel class;
    producing a second implementation of said interface method that sets the value of a reference when said interface method name includes a first prefix and when the reference associated with said interface method is found in said metamodel class;
    producing a third implementation of said interface method that gets the value of an attribute when said interface method name includes a second prefix and when the attribute associated with said interface method is found in said metamodel class;
    producing a fourth implementation of said interface method that gets the value of a reference when said interface method name includes a second prefix and when the reference associated with said interface method is found in said metamodel class; and
    producing a fifth implementation of said interface method that executes an operation when said interface method has the same name as said operation.

43. The program storage device of claim 42 wherein
    said first prefix is "set"; and
    said second prefix is "get".

44. The program storage device of claim 42 wherein said producing a first implementation further comprises:
    receiving an attribute name and an attribute value; and
    producing an implementation that calls a handler method of a superclass of said class, passing said attribute name and said attribute value as arguments.

45. The program storage device of claim 42 wherein said producing a second implementation further comprises:
    receiving a reference name and a reference value; and
    producing an implementation that calls a handler method of a superclass of said class, passing said reference name and said reference value as arguments.

46. The program storage device of claim 42 wherein said producing a third implementation further comprises:
    receiving an attribute name;
    producing an implementation that calls a handler method of a superclass of said class, passing said attribute name as an argument and returning the attribute value associated with said attribute name; and
    returning said attribute value.

47. The program storage device of claim 42 wherein said producing a fourth implementation further comprises:
    receiving a reference name;
    producing an implementation that calls a handler method of a superclass of said class, passing said reference name as an argument and returning the reference value associated with said reference name; and
    returning said reference value.

48. The program storage device of claim 42 wherein said producing a fifth implementation further comprises:
    receiving an operation name and any associated arguments;
    producing an implementation that calls a handler method of a superclass of said class, passing said operation name and said associated arguments as arguments and returning an operation return value; and
    returning said operation return value.

49. A program storage device readable by a machine, embodying a program of instructions executable by the machine to perform a method to dynamically implement a Java™ Metadata Interface (JMI) to a metamodel, the method comprising:
    receiving a JMI implementation request, said request associated with a metamodel, said metamodel comprising at least one package, said at least one package comprising at least one class, said at least one class comprising at least one attribute, reference or operation;
    implementing, dynamically and automatically at runtime, a JMI interface when said JMI interface is unimplemented; and
    executing a stored JMI interface implementation when said JMI interface is implemented, wherein
    said implementing further comprises:
        implementing a package proxy JMI interface when said request comprises a package proxy request and when said package proxy JMI interface is unimplemented;
        implementing a class proxy JMI interface when said request comprises a class proxy request and when said class proxy JMI interface is unimplemented; and
        implementing a class instance JMI interface when said request comprises a class instance request and when said class instance JMI interface is unimplemented; and
    said executing further comprises:
        executing a stored a package proxy JMI interface implementation when said request comprises a package proxy request and when said package proxy JMI interface is implemented;
        executing a stored class proxy JMI interface when said request comprises a class proxy request and when said class proxy JMI interface is implemented; and
        executing a stored class instance JMI interface when said request comprises a class instance request and when said class instance JMI interface is implemented.

50. The program storage device of claim 49 wherein said implementing a package proxy JMI interface comprises:

generating bytecode for a class that implements said package proxy JMI interface;
creating a new instance of said class; and
returning said instance.

51. A program storage device readable by a machine, embodying a program of instructions executable by the machine to perform a method to dynamically implement a Java™ Metadata Interface (JMI) to a metamodel, the method comprising:
receiving a JMI implementation request, said request associated with a metamodel, said metamodel comprising at least one package, said at least one package comprising at least one class, said at least one class comprising at least one attribute, reference or operation;
implementing a JMI interface when said JMI interface is unimplemented, wherein said implementing further comprises:
implementing a package proxy JMI interface when said request comprises a package proxy request and when said package proxy JMI interface is unimplemented wherein said implementing a package proxy JMI interface comprises:
generating bytecode for a class that implements said package proxy JMI interface wherein said generating further comprises:
receiving a metamodel package;
receiving a package proxy interface method associated with said metamodel package;
determining a class name based upon said interface method;
searching said metamodel package for a class corresponding to said class name; and
producing an implementation of said interface method that returns a proxy for said class when said class name is found in said metamodel package;
creating a new instance of said class; and
returning said instance;
implementing a class proxy JMI interface when said request comprises a class proxy request and when said class proxy JMI interface is unimplemented; and
implementing a class instance JMI interface when said request comprises a class instance request and when said class instance JMI interface is unimplemented; and
executing a stored JMI interface implementation when said JMI interface is implemented, wherein said executing further comprises:
executing a stored a package proxy JMI interface implementation when said request comprises a package proxy request and when said package proxy JMI interface is implemented;
executing a stored class proxy JMI interface when said request comprises a class proxy request and when said class proxy JMI interface is implemented; and
executing a stored class instance JMI interface when said request comprises a class instance request and when said class instance JMI interface is implemented.

52. The program storage device of claim 51 wherein said implementation of said interface method calls a handler method of a superclass of said class, passing said class name as an argument and returning the proxy for said class.

53. The program storage device of claim 51 wherein said implementing a class proxy JMI interface comprises:
generating bytecode for a class that implements said class proxy JMI interface;
creating a new instance of said class; and
returning said instance.

54. The program storage device of claim 53 wherein said generating further comprises:
receiving a metamodel class;
receiving a class proxy interface method associated with said metamodel class;
producing a first implementation of said interface method that creates a new instance of said class when said interface method is parameterless; and
producing a second implementation of said interface method that creates a new instance of said class and sets attributes passed as arguments to said interface method when said interface method includes at least one parameter.

55. The program storage device of claim 54 wherein said first implementation calls a handler method of a superclass of said class, passing said class name as an argument and returning a new instance of said class.

56. The program storage device of claim 54 wherein said second implementation calls a handler method of a superclass of said class, passing said class name, said attributes, and attribute values as arguments and returning a new instance of said class.

57. The program storage device of claim 51 wherein said implementing a class instance JMI interface comprises:
generating bytecode for a class that implements said class instance JMI interface;
creating a new instance of said class; and
returning said instance.

58. The program storage device of claim 57 wherein said generating further comprises:
receiving a metamodel class;
receiving a class instance interface method associated with said metamodel class, said interface method having an interface method name;
producing a first implementation of said interface method that sets the value of an attribute when said interface method name includes a first prefix and when the attribute associated with said interface method is found in said metamodel class;
producing a second implementation of said interface method that sets the value of a reference when said interface method name includes a first prefix and when the reference associated with said interface method is found in said metamodel class;
producing a third implementation of said interface method that gets the value of an attribute when said interface method name includes a second prefix and when the attribute associated with said interface method is found in said metamodel class;
producing a fourth implementation of said interface method that gets the value of a reference when said interface method name includes a second prefix and when the reference associated with said interface method is found in said metamodel class; and
producing a fifth implementation of said interface method that executes an operation when said interface method has the same name as said operation.

59. The program storage device of claim 58 wherein
said first prefix is "set"; and
said second prefix is "get".

60. The program storage device of claim 58 wherein said producing a first implementation further comprises:
receiving an attribute name and an attribute value; and producing an implementation that calls a handler method of a superclass of said class, passing said attribute name and said attribute value as arguments.

61. The program storage device of claim 58 wherein said producing a second implementation further comprises:

receiving a reference name and an reference value; and producing an implementation that calls a handler method of a superclass of said class, passing said reference name and said reference value as arguments.

62. The program storage device of claim 58 wherein said producing a third implementation further comprises:

receiving an attribute name;

producing an implementation that calls a handler method of a superclass of said class, passing said attribute name as an argument and returning the attribute value associated with said attribute name; and returning said attribute value.

63. The program storage device of claim 58 wherein said producing a fourth implementation further comprises:

receiving a reference name;

producing an implementation that calls a handler method of a superclass of said class, passing said reference name as an argument and returning the reference value associated with said reference name; and returning said reference value.

64. The program storage device of claim 58 wherein said producing a fifth implementation further comprises:

receiving an operation name and any associated arguments;

producing an implementation that calls a handler method of a superclass of said class, passing said operation name and said associated arguments as arguments and returning an operation return value; and returning said operation return value.

* * * * *